(12) United States Patent
Shiomi et al.

(10) Patent No.: US 9,890,683 B2
(45) Date of Patent: Feb. 13, 2018

(54) EXHAUST GAS PURIFICATION SYSTEM

(71) Applicant: YANMAR CO., LTD., Osaka (JP)

(72) Inventors: Hideo Shiomi, Osaka (JP); Tomohiro Fukuda, Osaka (JP); Atsushi Ohta, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 13 days.

(21) Appl. No.: 14/780,612

(22) PCT Filed: Mar. 26, 2014

(86) PCT No.: PCT/JP2014/058433
§ 371 (c)(1),
(2) Date: Sep. 28, 2015

(87) PCT Pub. No.: WO2014/157288
PCT Pub. Date: Oct. 2, 2014

(65) Prior Publication Data
US 2016/0061086 A1  Mar. 3, 2016

(30) Foreign Application Priority Data

Mar. 29, 2013  (JP) ................................ 2013-072520
Mar. 29, 2013  (JP) ................................ 2013-072521

(51) Int. Cl.
*F01N 3/025* (2006.01)
*F01N 9/00* (2006.01)
(Continued)

(52) U.S. Cl.
CPC ........... *F01N 9/002* (2013.01); *F01N 3/0232* (2013.01); *F01N 3/0253* (2013.01);
(Continued)

(58) Field of Classification Search
CPC ........ F01N 3/0253; F01N 3/225; F01N 3/323; F01N 2430/00; F01N 2610/03; F01N 2900/1602; F01N 2900/1606
(Continued)

(56) References Cited

U.S. PATENT DOCUMENTS

2004/0226287 A1* 11/2004 Edgar ..................... F01N 3/023
60/295
2007/0204601 A1* 9/2007 Ishii ......................... B60K 6/48
60/295

(Continued)

FOREIGN PATENT DOCUMENTS

CN 102933802 A 2/2013
EP 2505799 A1 10/2012
(Continued)

*Primary Examiner* — Jorge Leon, Jr.
(74) *Attorney, Agent, or Firm* — Norris McLaughlin & Marcus P.A.

(57) ABSTRACT

It is an object to make it possible to burn and remove particulate matter without generating runaway even if the particulate matter is excessively accumulated at the time of regeneration of an exhaust gas purification device. A common rail engine and the exhaust gas purification device placed in an exhaust gas path of the engine are provided. A plurality of regeneration controls for burning and removing the particulate matter accumulated in the exhaust gas purification device can be executed. The plurality of regeneration controls include at least non-operation regeneration control for raising exhaust gas temperature by combining post injection (E) and predetermined high speed rotation speed, and recovery regeneration control which can be executed when the non-operation regeneration control fails. In the non-operation regeneration control and the recovery regeneration control, the engine is driven exclusively for burning and removing the particulate matter. The recovery regeneration control is carried out at exhaust gas tempera- (Continued)

ture lower than that of the non-operation regeneration control while taking time longer than that of the non-operation regeneration control.

6 Claims, 21 Drawing Sheets

(51) Int. Cl.
*F02D 41/02* (2006.01)
*F02D 41/40* (2006.01)
*F01N 3/023* (2006.01)
*F02D 41/38* (2006.01)
*F01N 3/32* (2006.01)
*F01N 3/22* (2006.01)
*F01N 3/035* (2006.01)
*F01N 13/00* (2010.01)

(52) U.S. Cl.
CPC ....... *F02D 41/029* (2013.01); *F02D 41/0245* (2013.01); *F02D 41/3809* (2013.01); *F02D 41/405* (2013.01); *F01N 3/035* (2013.01); *F01N 3/225* (2013.01); *F01N 3/323* (2013.01); *F01N 13/0097* (2014.06); *F01N 2430/00* (2013.01); *F01N 2590/08* (2013.01); *F01N 2610/03* (2013.01); *F01N 2900/1602* (2013.01); *F01N 2900/1606* (2013.01); *F02D 2200/101* (2013.01); *Y02T 10/26* (2013.01); *Y02T 10/44* (2013.01)

(58) Field of Classification Search
USPC ......... 60/277, 285, 286, 295, 297, 298, 303, 60/311, 320
See application file for complete search history.

(56) References Cited

U.S. PATENT DOCUMENTS

| | | | |
|---|---|---|---|
| 2009/0025371 A1* | 1/2009 | Hermansson | B60K 6/445 60/286 |
| 2010/0089035 A1* | 4/2010 | Kamiya | E02F 9/00 60/277 |
| 2011/0072797 A1* | 3/2011 | Van Nieuwstadt | F01N 3/0238 60/285 |
| 2011/0072802 A1* | 3/2011 | Bidner | F01N 3/023 60/287 |
| 2011/0258986 A1* | 10/2011 | Fath | F01N 3/025 60/274 |
| 2012/0282159 A1* | 11/2012 | Takayanagi | B01D 46/0063 423/212 |
| 2013/0086890 A1* | 4/2013 | Noma | F01N 11/00 60/277 |
| 2014/0000248 A1* | 1/2014 | Mitani | B03C 3/41 60/311 |
| 2014/0041362 A1* | 2/2014 | Ulrey | F02D 41/0087 60/274 |
| 2014/0190147 A1* | 7/2014 | Roos | F01N 3/0238 60/274 |

FOREIGN PATENT DOCUMENTS

| | | | |
|---|---|---|---|
| EP | 2578826 A1 | 4/2013 | |
| JP | 2000-145480 | 5/2000 | |
| JP | 2003-027922 | 1/2003 | |
| JP | 2009-079500 | 4/2009 | |
| JP | 2011-163199 | 8/2011 | |
| JP | 2011-252435 | 12/2011 | |
| WO | WO 2011152165 A1 * | 12/2011 | ........... F02D 41/029 |

* cited by examiner

EXHAUST GAS PURIFICATION SYSTEM

TECHNICAL FIELD

The present invention relates to an exhaust gas purification system for an engine provided in an operation machine such as a construction machine, an agricultural machine and an engine power generator.

BACKGROUND ART OF THE INVENTION

As countermeasures against exhaust gas of a diesel engine (simply engine, hereinafter), there is such a well-known conventional technique that particulate matter (PM) and the like in exhaust gas are collected by providing an exhaust gas filter (diesel particulate filter) in an exhaust gas path of an engine, and exhaust gas is restrained from being discharged into atmosphere (see Patent Documents 1 and 2 for example). If PM collected by the exhaust gas filter exceeds a prescribed amount, flowing resistance in the exhaust gas filter is increased and engine output is lowered. Therefore, PM accumulated on the exhaust gas filter is removed by raising temperature of exhaust gas, thereby restoring (regenerating) PM collecting ability of the exhaust gas filter in some cases. When the exhaust gas filter is not sufficiently regenerated even if the temperature of the exhaust gas is increased, it is possible to facilitate the regeneration of the exhaust gas filter by supplying unburned fuel into the exhaust gas filter to burn PM. Such reset regeneration technique is also known.

CITATION LIST

Patent Document 1: Japanese Unexamined Patent Publication No. 2000-145430
Patent Document 2: Japanese Unexamined Patent Publication No. 2003-27922

SUMMARY OF THE INVENTION

However, even if the reset regeneration to supply unburned fuel into the exhaust gas filter is executed, if an operation state in which sufficient temperature-raising effect cannot be obtained is continued, PM is excessively accumulated in the exhaust gas filter in some cases. If the regeneration of the exhaust gas filter is carried out under such a condition, the following adverse effect may occur. That is, excessively accumulated PM is abruptly burned (runaway burned) and the exhaust gas filter has a crack or is adversely dissolved.

The above circumstances have been studied, and it is a technical object of the present invention to provide an improved exhaust gas purification system.

A first aspect of the present invention provides an exhaust gas purification system including a common rail engine, and an exhaust gas purification device placed in an exhaust gas path of the engine, in which the exhaust gas purification system can execute a plurality of regeneration controls for burning and removing particulate matter accumulated in the exhaust gas purification device, wherein the plurality of regeneration controls include at least non-operation regeneration control for raising exhaust gas temperature by combining post injection and predetermined high speed rotation speed, and recovery regeneration control which can be executed when the non-operation regeneration control fails, in the non-operation regeneration control and the recovery regeneration control, the engine is driven exclusively for burning and removing the particulate matter, and the recovery regeneration control is carried out at exhaust gas temperature lower than that of the non-operation regeneration control while taking time longer than that of the non-operation regeneration control.

According to a second aspect of the invention, in the exhaust gas purification system in the first aspect, when the non-operation regeneration control fails, procedure is shifted to a recovery standby mode for waiting establishment of a preset recovery shifting condition, and when the recovery shifting condition is not established, the procedure waits in the recovery standby mode.

According to a third aspect of the invention, in the exhaust gas purification system in the second aspect, during execution of the recovery regeneration control, when a preset recovery releasing condition is established, the recovery regeneration control is interrupted.

According to a fourth aspect of the invention, in the exhaust gas purification system in any of the first to third aspects, when the recovery regeneration control is completed, the procedure is returned to normal operation control.

According to a fifth aspect of the invention, in the exhaust gas purification system in the first aspect, the plurality of regeneration controls include at least reset regeneration control for raising exhaust gas temperature using the post injection, non-operation regeneration control for raising exhaust gas temperature by combining the post injection and predetermined high speed rotation speed, and recovery regeneration control which can be executed when the non-operation regeneration control fails, in the non-operation regeneration control and the recovery regeneration control, the engine is driven exclusively for burning and removing the particulate matter, the exhaust gas purification system is set such that procedure is shifted from the reset regeneration control to the recovery regeneration control through the non-operation regeneration control, and when the procedure is shifted from the reset regeneration control to the non-operation regeneration control, the procedure is shifted through a non-operation standby mode for waiting for establishment of a preset non-operation shifting condition, and when the procedure is shifted from the non-operation regeneration control to the recovery regeneration control, the procedure is shifted through the recovery standby mode for waiting establishment of a preset recovery shifting condition, and when these shifting conditions are not established, the procedure waits in the respective standby modes.

According to a sixth aspect of the invention, in the exhaust gas purification system in the fifth aspect, in the non-operation regeneration control, output of the engine lower than maximum output of the engine.

According to a seventh aspect of the invention, in the exhaust gas purification system in the fifth or sixth aspect, in the recovery regeneration control, maximum output of the engine is lower than maximum output at a time of non-operation regeneration control.

According to the first aspect of the invention, there is provided an exhaust gas purification system including a common rail engine, and an exhaust gas purification device placed in an exhaust gas path of the engine, in which the exhaust gas purification system can execute a plurality of regeneration controls for burning and removing particulate matter accumulated in the exhaust gas purification device, wherein the plurality of regeneration controls include at least non-operation regeneration control for raising exhaust gas temperature by combining post injection and predetermined high speed rotation speed, and recovery regeneration control which can be executed when the non-operation regeneration control fails, in the non-operation regeneration control and the recovery regeneration control, the engine is driven exclusively for burning and removing the particulate matter, and the recovery regeneration control is carried out at exhaust gas temperature lower than that of the non-operation regeneration control while taking time longer than that of the non-operation regeneration control. Therefore, even if the particulate matter is excessively accumulated in the exhaust gas purification system, it is possible to burn and remove the particulate matter without generating runaway combustion. Thus, it is possible to prevent the exhaust gas purification system from being damaged (adversely dissolved), and to prevent emission from being excessively discharged.

According to the second and third aspects of the invention, if the procedure is once shifted to the recovery standby mode, the procedure is shifted only to the recovery regeneration control or the recovery standby mode thereafter. Therefore, regeneration control which may cause the runaway combustion is not executed, and it is possible to prevent the runaway combustion from generating.

According to the fourth aspect of the invention, when the recovery regeneration control is completed, the procedure is returned to normal operation control. Therefore, it is unnecessary for an operator to carry out a return operation to switch between the modes, the trouble is saved and an operation load of the operator can be reduced.

According to the fifth aspect of the invention, the plurality of regeneration controls include at least reset regeneration control for raising exhaust gas temperature using the post injection, non-operation regeneration control for raising exhaust gas temperature by combining the post injection and predetermined high speed rotation speed, and recovery regeneration control which can be executed when the non-operation regeneration control fails, and in the non-operation regeneration control and the recovery regeneration control, the engine is driven exclusively for burning and removing the particulate matter. Thus, under the non-operation regeneration control and the recovery regeneration control, the engine is not normally operated. That is, the non-operation regeneration control and the recovery regeneration control exist as modes for avoiding a crisis to prevent the exhaust gas purification device from being damaged (adversely dissolved) and to prevent emission from being excessively discharged.

Based on this, the exhaust gas purification system is set such that procedure is shifted from the reset regeneration control to the recovery regeneration control through the non-operation regeneration control, and when the procedure is shifted from the reset regeneration control to the non-operation regeneration control, the procedure is shifted through a non-operation standby mode for waiting for establishment of a preset non-operation shifting condition, and when the procedure is shifted from the non-operation regeneration control to the recovery regeneration control, the procedure is shifted through the recovery standby mode for waiting establishment of a preset recovery shifting condition, and when these shifting conditions are not established, the procedure waits in the respective standby modes. Hence, if the procedure is once shifted to the standby mode, the procedure is shifted only to the non-operation regeneration control or the recovery regeneration control. Therefore, regeneration control which may cause the runaway combustion is not executed and it is possible to prevent the runaway combustion from generating. Thus, it is possible to reliably avoid a crisis to prevent the exhaust gas purification device from being damaged (adversely dissolved) and to prevent emission from being excessively discharged.

According to the sixth and seventh aspects of the invention, in the non-operation regeneration control, output of the engine is limited to maximum output at the time of non-operation which is lower than maximum output, and in the recovery regeneration control, output of the engine is limited to maximum output at the time of recovery which is lower than the maximum output at the time of non-operation. Therefore, when the non-operation regeneration control or the recovery regeneration control is executed, it is possible to prevent temperature and pressure of exhaust gas from excessively rising, to prevent an exhaust gas system part such as the exhaust gas purification device from being deteriorated by temperature raising, and to restrain exhaust gas from leaking from a bonded portion of the exhaust gas system part by pressure raising.

DESCRIPTION OF THE PREFERRED EMBODIMENTS

Figure 1:
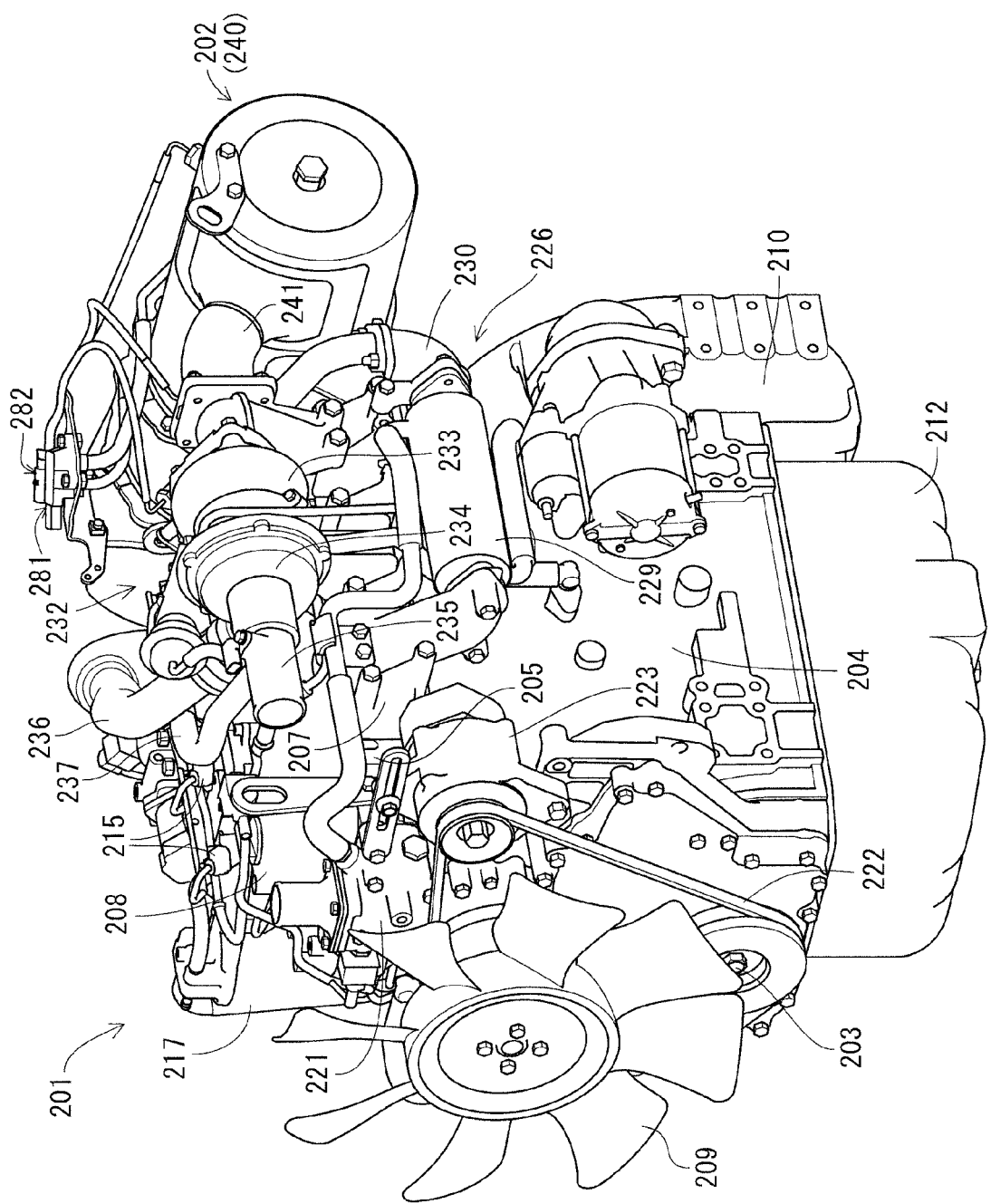
FIG. 1 is a perspective view of an engine as viewed from diagonally front.

An embodiment in which the invention of the present application is embodied will be described below based on the drawings.

(1). Outlines of Engine

First, outlines of a common rail engine 201 will be described with reference to FIGS. 1 to 6. In the following description, both sides which are parallel to a crankshaft axis (both sides of crankshaft axis) are called front and rear, a side where a cooling fan 209 is placed is called a right side, a side where a flywheel housing 210 is placed is called a left side, a side where an exhaust manifold 7 is placed is called a front side, and a side where an intake manifold 6 is placed is called a rear side, and they serve as the basis of a positional relation of four directions and upward and downward directions of the engine 201.

As shown in FIGS. 1 to 6, the engine 201 as a prime mover provided in an operation machine such as an agricultural machine, a construction machine and an earth-moving machine includes an exhaust gas filter 202 (diesel particulate filter) which is a continuous regeneration exhaust gas purification device. Particulate matter (PM) in exhaust gas discharged from the engine 201 is removed by the exhaust gas filter 202, and carbon monoxide (CO) and hydrocarbon (HC) in exhaust gas are reduced.

The engine 201 includes a crankshaft 203 which is an engine output shaft and a cylinder block 204 in which pistons (not shown) are incorporated. A cylinder head 205 is mounted on the cylinder block 204. The intake manifold 206 is placed on a rear surface of the cylinder head 205, and the exhaust manifold 207 is placed on a front surface of the cylinder head 205. An upper surface of the cylinder head 205 is covered with a head cover 208. Both right and left ends of the crankshaft 203 project from both right and left surfaces of the cylinder block 204. A cooling fan 209 is provided on the side of a right surface of the engine 201. Rotation power is transmitted from the left end of the crankshaft 203 to the cooling fan 209 through a cooling fan V-belt 222.

The flywheel housing 210 is provided on the side of a rear surface of the engine 201. A flywheel 211 is accommodated in the flywheel housing 210 in a state where the flywheel 211 is rotatably supported on the side of a rear end of the crankshaft 203. Rotation power of the engine 201 is transmitted from the crankshaft 203 to an operation portion of the operation machine through the flywheel 211. An oil pan 212 in which lubricating oil is stored is placed on a lower surface of the cylinder block 204. The lubricating oil in the oil pan 212 is supplied to lubrication portions of the engine 201 through an oil filter 213 and the like placed on a rear surface of the cylinder block 204 and then, the lubricating oil returns to the oil pan 212.

A fuel supply pump 214 is provided above the oil filter 213 (below intake manifold 206) in a rear surface of the cylinder block 204. The engine 201 includes injectors 215 for four cylinders each having an electromagnetic open/close control type fuel injection valve 219 (see FIG. 10). A common rail device 220 is provided below the intake manifold 206 on a rear surface of the cylinder block 204. The common rail device 220 injects fuel into the cylinders of the engine 201 in multi-stages during one combustion cycle. Each injector 215 is connected to a fuel tank 218 provided in the operation machine through the fuel supply pump 214, the common rail device 220 and a fuel filter 217. Fuel in the fuel tank 218 is sent under pressure from the fuel supply pump 214 to the common rail device 220 through the fuel filter 217. By controlling the open/close operation of the fuel injection valves 219 of the injectors 215, high pressure fuel stored in the common rail device 220 is injected from the injectors 215 into the cylinders of the engine 201.

A cooling water pump 221 for cooling water lubrication is placed on the side of a left surface of the cylinder block 204. The cooling water pump 221 is placed coaxially with a fan shaft of the cooling fan 209. The cooling water pump 221 is driven together with the cooling fan 209 by rotation power of the crankshaft 203 through the cooling fan V-belt 222. Cooling water in a radiator (not shown) provided in the operation machine is supplied to the cylinder block 204 and the cylinder head 205 by driving the cooling water pump 221, thereby cooling the engine 201. The cooling water which cools the engine 201 is returned to the radiator. An alternator 223 is placed on the left side of the cooling water pump 221.

Engine leg mounting portions 224 are respectively provided on the front and rear surfaces of the cylinder block 204. Engine legs (not shown) having vibration-proofing rubbers are fastened to the engine leg mounting portions 224 by bolts. The engine 201 is supported by the operation machine (more specifically, engine-mounting chassis) through the engine legs in a vibration-proofing manner.

Figure 2:
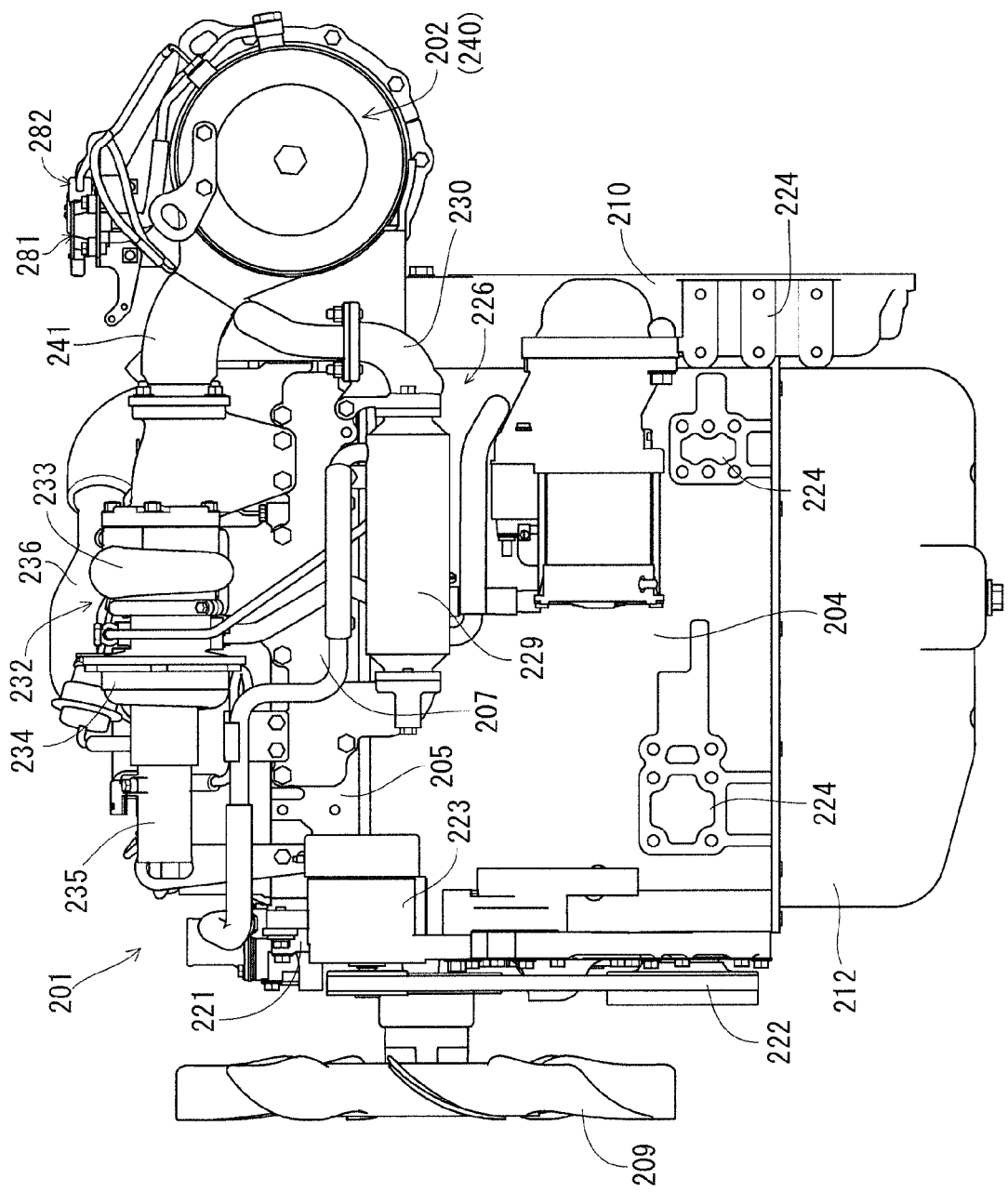
FIG. 2 is a front view of the engine.
Figure 3:
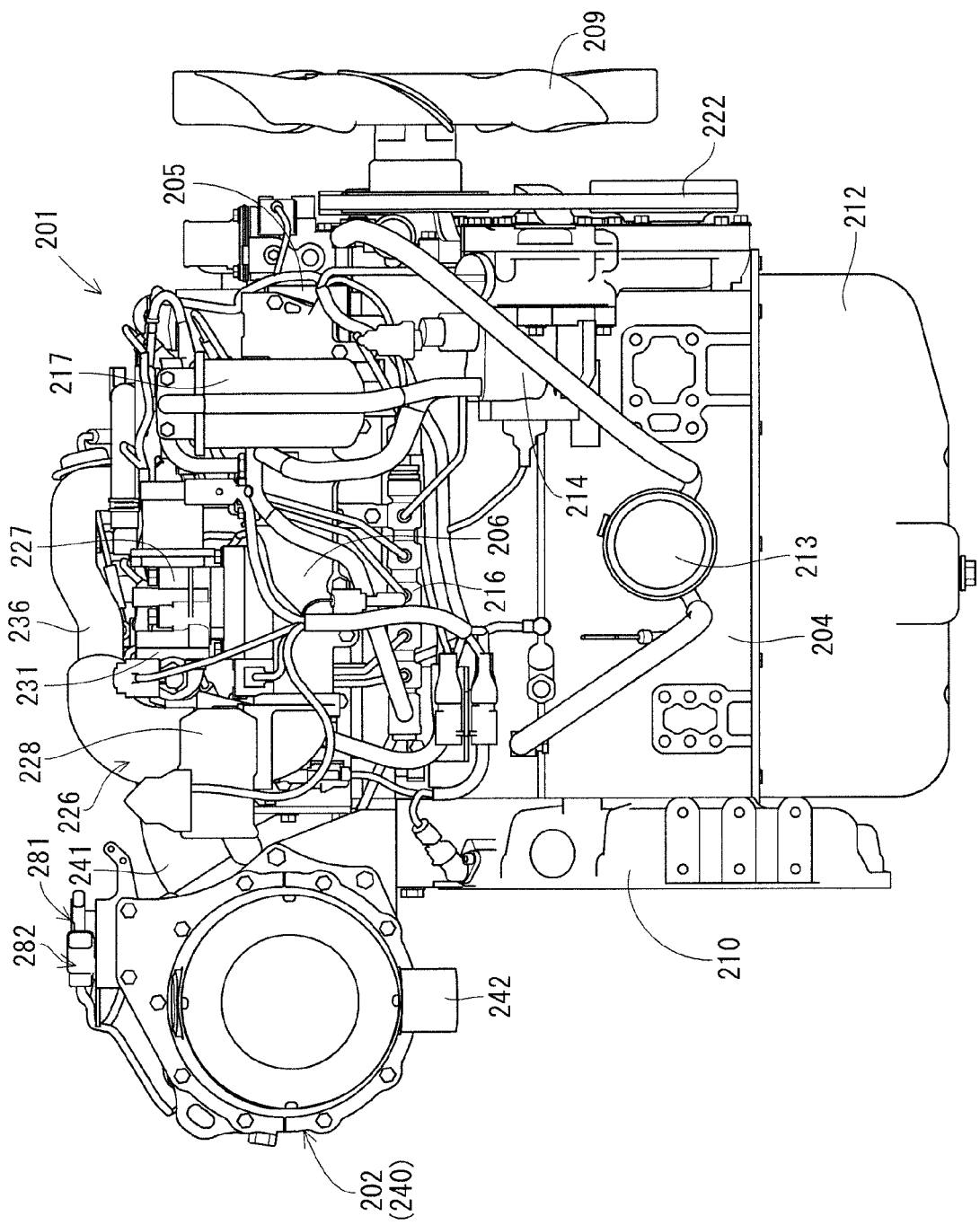
FIG. 3 is a back view of the engine.
Figure 4:
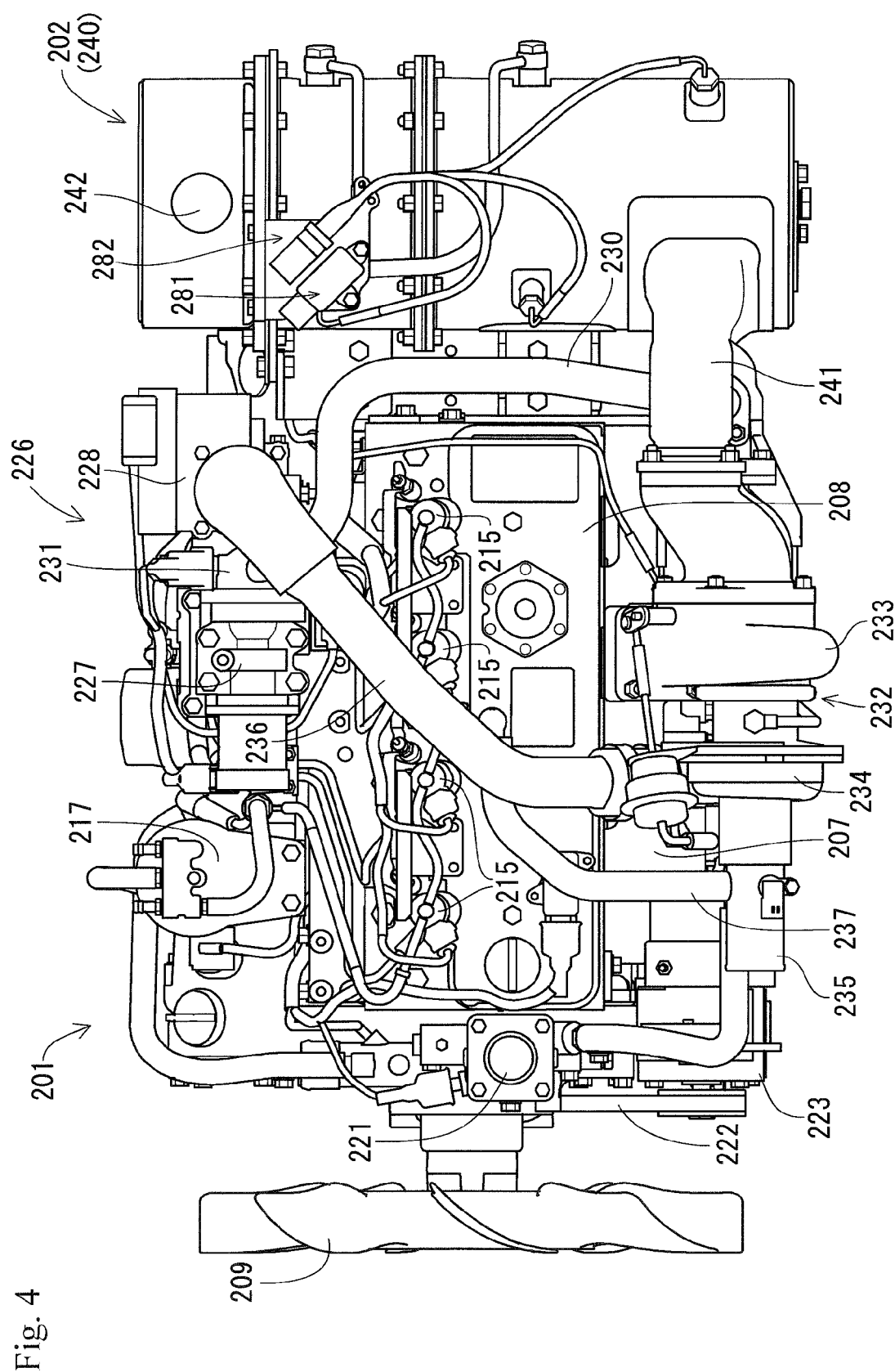
FIG. 4 is a plan view of the engine.
Figure 5:
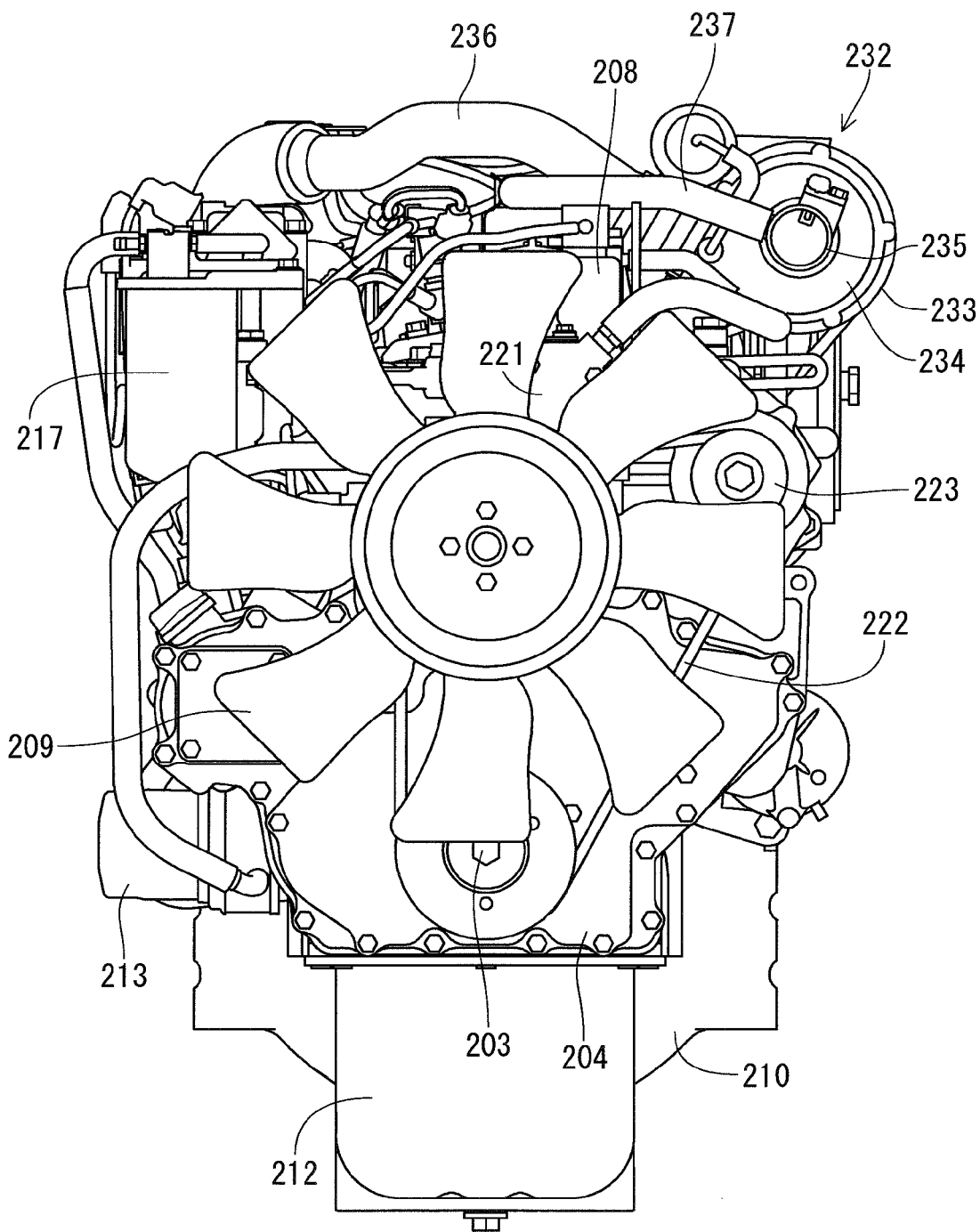
FIG. 5 is a right side view of the engine.
Figure 6:
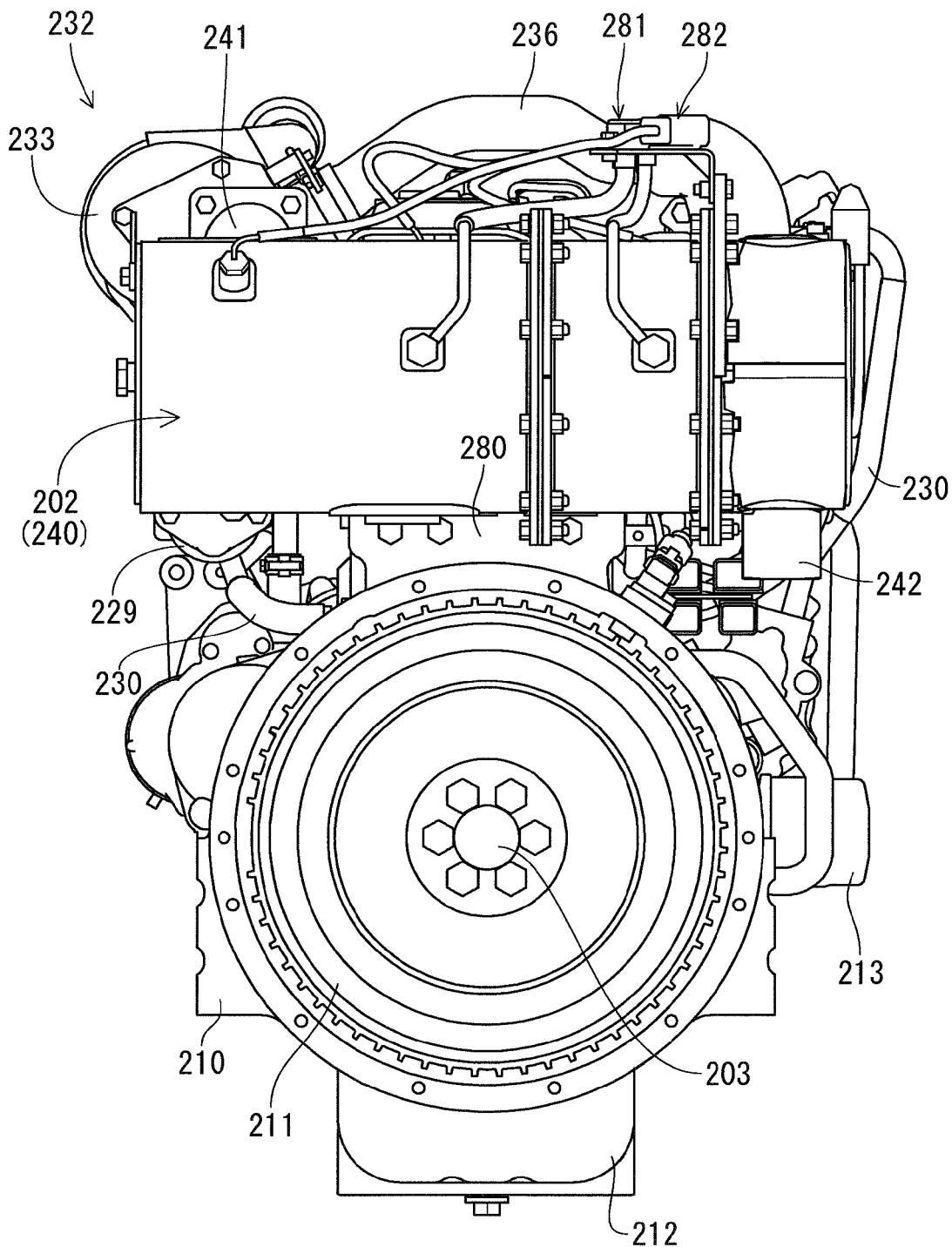
FIG. 6 is a left side view of the engine.

As shown in FIGS. 2 and 4, an inlet of the intake manifold 206 is connected to an air cleaner (not shown) through an EGR device 226 (exhaust gas recirculation device). New air (outside air) sucked into the air cleaner is purified and dust is removed from the new air by the air cleaner and then, the new air is sent to the intake manifold 206 through the EGR device 226 and is supplied to the cylinders of the engine 201.

The EGR device 226 includes an EGR body case 227. The EGR body case 227 mixes a portion of exhaust gas of the engine 201 (EGR gas from exhaust manifold 207) and new air (outside air from air cleaner) with each other, and supplies the mixture to the intake manifold 206. The EGR device 226 also includes an intake throttle member 228 which brings the EGR body case 227 into communication with the air cleaner, a recirculation exhaust gas pipe 230 connected to the exhaust manifold 207 through an EGR cooler 229, and an EGR valve member 231 which brings the EGR body case 227 into communication with the recirculation exhaust gas pipe 230.

The intake throttle member 228 is connected to the intake manifold 206 through the EGR body case 227. The intake throttle member 228 is fastened to one longitudinal end of the EGR body case 227 by a bolt. Right and left inward-looking open ends of the EGR body case 227 are fastened to an inlet of the intake manifold 206 by bolts. An outlet of the recirculation exhaust gas pipe 230 is connected to the EGR body case 227 through the EGR valve member 231. An inlet of the recirculation exhaust gas pipe 230 is connected to a lower surface of the exhaust manifold 207 through the EGR cooler 229. By adjusting an opening degree of the EGR valve member 231, a supply amount of EGR gas to the EGR body case 227 is adjusted.

In the above-described configuration, new air (outside air) is supplied from the air cleaner into the EGR body case 227 through the intake throttle member 228, and EGR gas (a portion of exhaust gas discharged from exhaust manifold 207) is discharged from the exhaust manifold 207 into the EGR body case 227 through the EGR valve member 231. The new air from the air cleaner and the EGR gas from the exhaust manifold 207 are mixed with each other in the EGR body case 227 and then, the mixture gas in the EGR body case 227 is supplied to the intake manifold 206. By refluxing a portion of exhaust gas discharged from the exhaust manifold 207 to the engine 201 through the intake manifold 206 in this manner, the highest combustion temperature at the time of a high load operation is lowered, and a discharge amount of NOx (oxides of nitrogen) from the engine 201 is reduced.

As shown in FIGS. 1 to 5, a turbosupercharger 232 is placed on the right side of the cylinder head 205 and above the exhaust manifold 207. The turbosupercharger 232 includes a turbine case 233 in which a turbine wheel (not shown) is incorporated, and a compressor case 234 in which a blower wheel (not shown) is incorporated. An exhaust gas inlet of the turbine case 233 is connected to an outlet of the exhaust manifold 207. An exhaust gas outlet of the turbine case 233 is connected to a tail pipe (not shown) through the exhaust gas filter 202. Exhaust gas discharged from the cylinders of the engine 201 into the exhaust manifold 207 is discharged outside from the tail pipe through the turbine case 233 of the turbosupercharger 232 and the exhaust gas filter 202 and the like.

An intake inlet of the compressor case 234 is connected to the air cleaner through an intake pipe 235. An intake outlet of the compressor case 234 is connected to the intake throttle member 228 through a supercharger pipe 236. Dust is removed from the new air by the air cleaner, the new air is sent from the compressor case 234 to the intake manifold 206 through the intake throttle member 228 and the EGR body case 227, and the new air is supplied to the cylinders of the engine 201. The intake pipe 235 is connected to a breather chamber in the head cover 208 through a blow-by gas return pipe 237. Lubricating oil is separated and removed from blow-by gas in the breather chamber, the blow-by gas is returned to the intake pipe 235 through the blow-by gas return pipe 237, and the blow-by gas is refluxed to the intake manifold 206 and is again supplied to the cylinders of the engine 201.

(2). Structure of Exhaust Gas Filter

Next, a structure of the exhaust gas filter 202 will be described with reference to FIGS. 7 to 9. The exhaust gas filter 202 includes a purification casing 240 having a purification inlet pipe 241 and a purification outlet pipe 242. The purification casing 240 is made of heat resistant metal material. A diesel oxidation catalyst 243 such as platinum which produces nitrogen dioxide (NO2) and a soot filter 244 of honeycomb structure are arranged in series in a moving direction (see direction of arrow in FIG. 9) of exhaust gas and accommodated in the purification casing 240. The soot filter 244 continuously oxidizes and removes collected particulate matter (PM) at relatively low temperature. The purification inlet pipe 241 and the purification outlet pipe 242 are provided on both longitudinal sides of the purification casing 240 (one end side and the other end side). The purification inlet pipe 241 is connected to the exhaust gas outlet of the turbine case 233. The purification outlet pipe 242 is connected to the tail pipe (not shown).

In the above-described configuration, exhaust gas of the engine 201 flows from the exhaust gas outlet of the turbine case 233 into the purification casing 240 through the purification inlet pipe 241, the exhaust gas passes through the diesel oxidation catalyst 243 and the soot filter 244 in the order, and the exhaust gas is purified. Particle matter in the exhaust gas cannot pass through a porous partition wall between cells in the soot filter 244 and the particulate matter is collected. Thereafter, exhaust gas which passes through the diesel oxidation catalyst 243 and the soot filter 244 is discharged toward the tail pipe.

When the exhaust gas passes through the diesel oxidation catalyst 243 and the soot filter 244, if temperature of the exhaust gas exceeds regenerable temperature (e.g., about 300°), nitric oxide (NO) in the exhaust gas is oxidized into unstable nitrogen dioxide (NO2) by effect of the diesel oxidation catalyst 243. Oxygen (O) discharged when nitrogen dioxide is returned into nitric oxide oxidizes and removes particulate matter which is accumulated on the soot filter 244. According to this, particulate matter-collecting ability of the soot filter 244 is restored (soot filter 244 is self-regenerated). In this embodiment, the longitudinal other end of the purification casing 240 is configured as a silencer 245, and the silencer 245 is provided with the purification outlet pipe 242.

An inlet-side lid 254 is welded and fixed to one end of an inlet-side case 247 (end on the side of upstream of exhaust gas). One end of the inlet-side case 247 is closed with the inlet-side lid 254. The purification inlet pipe 241 is welded and fixed to an outer periphery of the inlet-side case 247. The purification inlet pipe 241 is in communication with an interior of the inlet-side case 247 through an exhaust gas inlet 255 formed in the inlet-side case 247. The inlet-side case 246 and the outlet-side case 247 are attachably and detachably fastened to each other by a plurality of thick plate-shaped flange bodies 271 and a plurality of bolts 272.

The silencer 45 located on the longitudinally other end of the purification casing 240 has a silencer case 251. One end of the silencer case 251 (end on the side of upstream of exhaust gas) is in communication with and connected to the outlet-side case 247. An outlet-side lid 265 is welded and fixed to the other end of the silencer case 251 (end on the side of downstream of exhaust gas). The silencer case 251 is provided with the purification outlet pipe 242 having a large number of exhaust gas communication holes. A projecting end of the purification outlet pipe 42 is connected to the tail pipe and an existing silencer member for example. The outlet-side case 247 and the silencer case 251 are attachably and detachably fastened to each other through a plurality of thick plate-shaped flange bodies 273 and a plurality of bolts 274.

A connecting leg 277 which supports the purification casing 240 in the engine 201 is attachably and detachably mounted on at least one of the thick plate-shaped flange bodies 273. A fixing leg 279 for supporting the purification casing 240 in the engine 201 is fixed to an outer periphery of the purification casing 240 (inlet-side case 247 in this embodiment) by welding. The connecting leg 277 and the fixing leg 279 are fastened, by bolts, to a casing mounting portion 280 formed on an upper surface of the flywheel housing 210. That is, the exhaust gas filter 202 is stably connected to and supported, by the connecting leg 277 and the fixing leg 279, on the flywheel housing 210 which is high rigid member.

Figure 7:
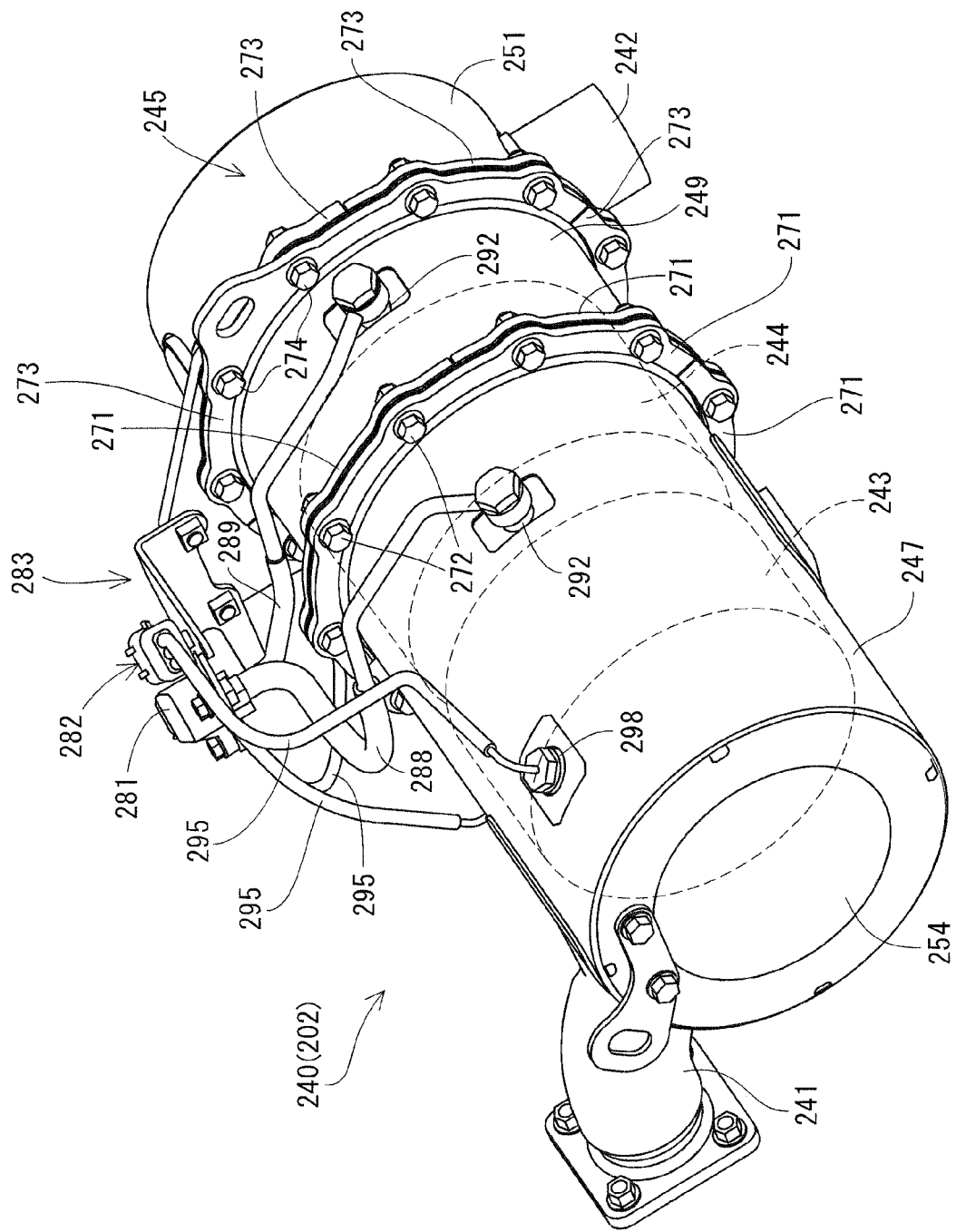
FIG. 7 is a perspective view of an outward appearance of an exhaust gas filter as viewed from a purification inlet pipe.
Figure 8:
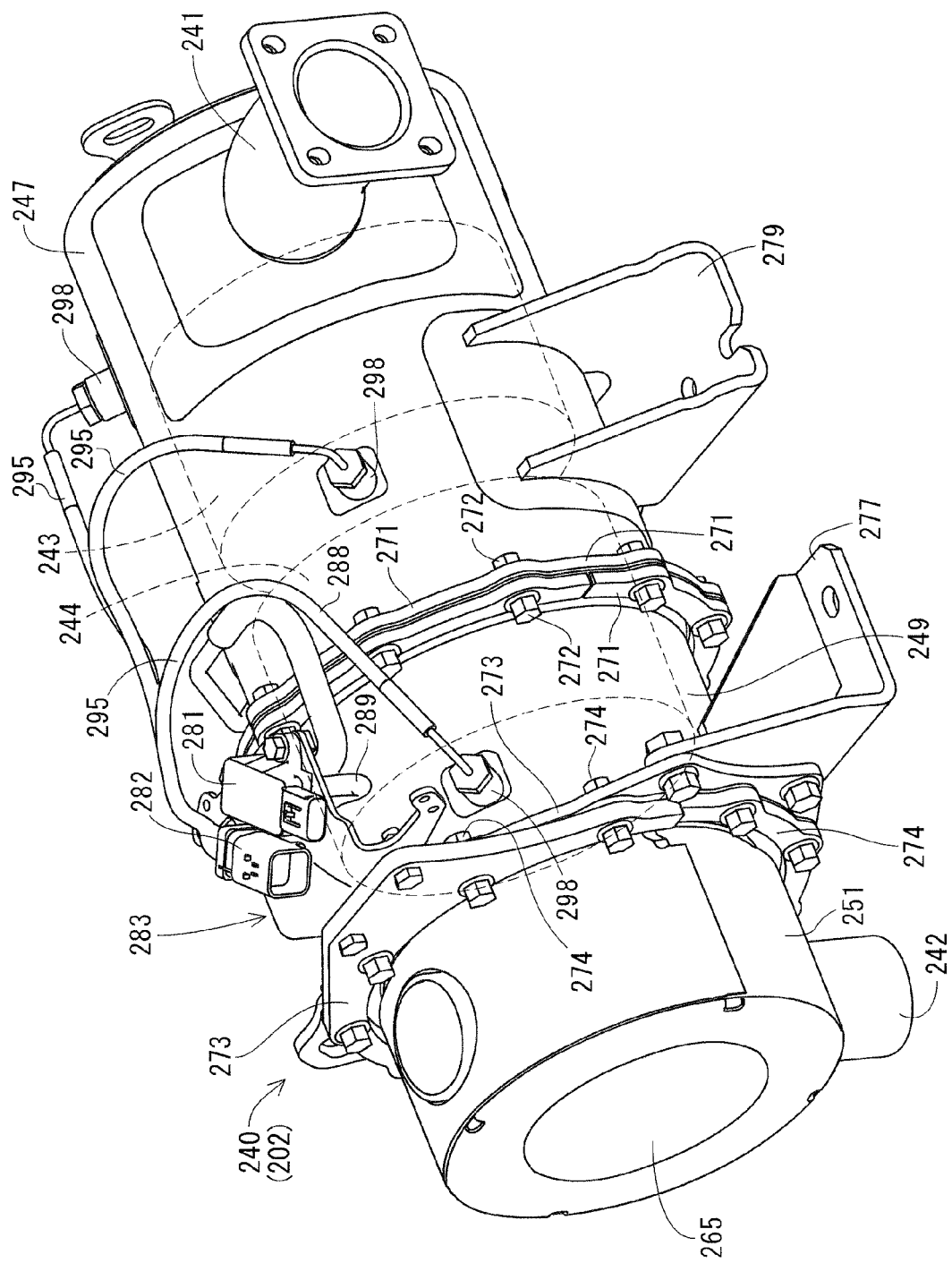
FIG. 8 is a perspective view the outward appearance of the exhaust gas filter as viewed from a purification outlet pipe.
Figure 9:
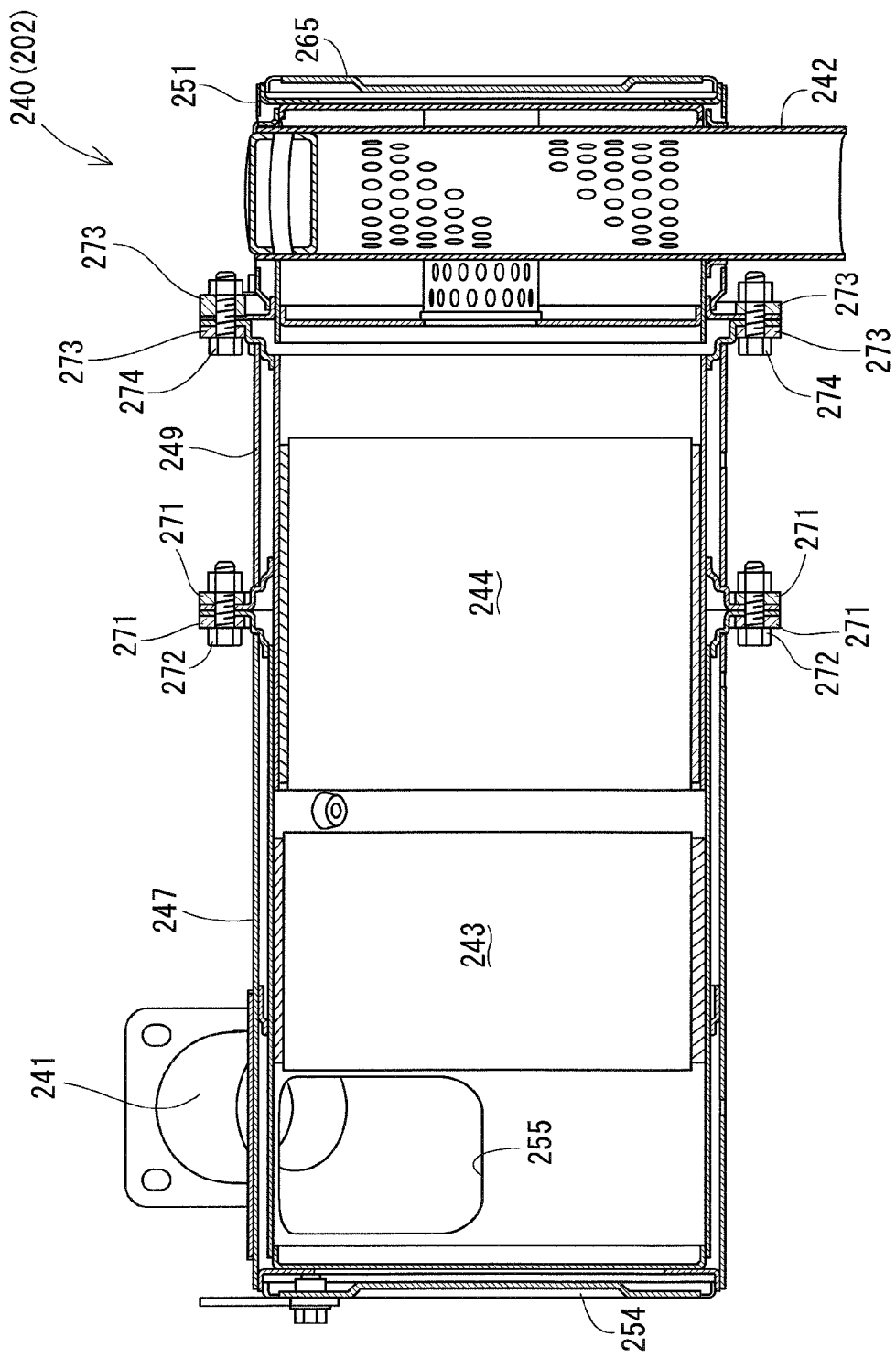
FIG. 9 is a sectional view for describing the exhaust gas filter.

As shown in FIGS. 7 and 8, an outer periphery of the purification casing 240 is provided with a differential pressure sensor 281 for detecting exhaust gas pressure in the purification casing 240, and electric wire connector 294 of a DPF temperature sensor 282 for detecting exhaust gas temperature in the purification casing 240. The differential pressure sensor 281 detects differential pressure of exhaust gas between exhaust gas upstream and exhaust gas downstream with respect to the soot filter 244. A PM accumulation amount of the soot filter 44 is calculated using the differential pressure, and a clogged state in the exhaust gas filter 202 is estimated. By controlling the operations of the intake throttle member 228 and a common rail 216 based on the calculation result of the PM accumulation amount, regeneration control of the soot filter 244 (exhaust gas filter 202) is carried out.

A sensor bracket 283 which supports the differential pressure sensor 281 and the DPF temperature sensor 282 of the electric wire connector 294 is attachably and detachably mounted on at least one of the thick plate-shaped flange bodies 273. The differential pressure sensor 281 and the DPF temperature sensor 282 of the electric wire connector 294 are arranged in parallel on the sensor bracket 283. One end of an upstream sensor pipe 288 and one end of a downstream sensor pipe 289 are connected to the differential pressure sensor 281. The purification casing 240 is provided with a pair of pressure boss bodies 292 in such a positional relation that the pressure boss bodies 292 sandwich the soot filter 244. Corresponding sensor pipes 288 and 289 are respectively connected to the pressure boss bodies 292. There are a plurality of electric wire connector 294 of the exhaust gas DPF temperature sensor 282, and sensor pipes 295 extend from the electric wire connector. Corresponding sensor pipes 295 are respectively connected to temperature boss bodies 298 provided on the purification casing 240.

(3). Outlines of Common Rail Device

Next, outlines of the common rail device 220 which is a fuel injection device will be described with reference to FIGS. 10 and 11. A fuel tank 218 is connected to the injectors 215 for the four cylinders in the engine 201 through the common rail device 220 and the fuel supply pump 214. As described above, each injector 215 has the electromagnetic open/close control type fuel injection valve 219. The common rail device 220 includes a cylindrical common rail 216 (accumulator). A suction side of the fuel supply pump 214 is connected to the fuel tank 218 through the fuel filter 217 and a low pressure pipe 261. Fuel in the fuel tank 218 is sucked into a fuel supply pump 216 through the fuel filter 217 and the low pressure pipe 261. The common rail 216 is connected to a discharge side of the fuel supply pump 216 through a high pressure pipe 262. The injectors 215 for the four cylinders are connected to the common rail 216 through four fuel injection pipes 263.

The fuel supply pump 214 is connected to the fuel tank 218 through a fuel return pipe 264. One end of a common rail return pipe 267 is connected to a longitudinal end of the common rail 216 through a return pipe connector 266 which limits pressure of fuel in the common rail 216. The other end of the common rail return pipe 267 is connected to the fuel tank 218 through the fuel return pipe 264 (merges with fuel return pipe 264). Surplus fuel of the fuel supply pump 214 and surplus fuel of the common rail 216 are recovered into the fuel tank 218 through the fuel return pipe 264 and the common rail return pipe 267.

In the above-described configuration, fuel in the fuel tank 218 is sent to the common rail 216 under pressure by the fuel supply pump 214, and the fuel is accumulated in the common rail 216 as high pressure fuel. By controlling the open/close operation of the fuel injection valves 219 (electronic control), injection pressure, injection timing and injection period (injection amount) of the high pressure fuel in the common rail 216 are precisely controlled, and the high pressure fuel is injected from the injectors 115 to the cylinders of the engine 201. Hence, it is possible to reduce oxides of nitrogen (NOx) discharged from the engine 201, and to reduce noise and vibration of the engine 201.

As shown in FIG. 1, the common rail device 220 is configured such that it executes main injection A in the vicinity of a location sandwiching a top dead center (TDC). Further, the common rail device 220 is configured such that in addition to the main injection A, the common rail device 220 also executes small amount of pilot injection B at timing of a crank angle θ1 which is faster than the top dead center by about 60° to reduce NOx and noise, executes pre injection C at timing of a crank angle θ2 immediately before the top dead center to reduce noise, and executes after injection D and post injection E at timing of crank angles θ3 and θ4 after the top dead center to reduce particulate matter (PM, hereinafter) and to facilitate purification of exhaust gas.

The pilot injection B facilitate mixing effect of fuel with air by injecting fuel at timing largely advancing angle with respect to the main injection A. The pre injection C injets fuel before the main injection A to shorten the delay of ignition timing of the main injection A. The after injection D injects fuel by retarding angle with respect to the main injection A to activate the diffusion of fuel and to rise the temperature of exhaust gas from the engine 201 (reheating PM). The post injection E injects fuel at timing largely retarding angle with respect to the main injection A to supply fuel to the exhaust gas filter 202 as unburned fuel without contributing to the actual combustion process. The unburned fuel supplied to the exhaust gas filter 202 reacts on the diesel oxidation catalyst 243, and the reaction heat rises temperature of exhaust gas in the exhaust gas filter 202. In broad terms, the height of turning points of a graph in FIG. 11 shows differences of fuel injection amount of the injection states A to E.

(4). Structure of Control Relevance of Engine

Next, control relevance of the engine 201 will be described with reference to FIGS. 10 to 13. As shown in FIG. 10, the engine 201 includes an ECU 311 which operates the fuel injection valves 219 of the cylinders in the engine 201. Although details of the ECU 311 will be omitted, the ECU 311 includes a CPU for executing various kinds of calculations and control, a ROM in which various kinds of data sets are previously stored in a fixed manner, an EEPROM in which a control program and various kinds of data sets are stored in a rewritable manner, a RAM in which a control program and various kinds of data sets are stored temporarily, a timer for counting time, and an input-output interface, and these elements are placed in the engine 201 or in the vicinity of the engine 201.

The ECU 311 is connected to a battery 332 through an electric source application key switch 331. The key switch 331 is a rotary switch capable of turning to three terminal positions by a predetermined key inserted into a key hole. The three terminal positions are an OFF position, an ON position and a START position. The key switch 331 is placed on an instrument panel 340 provided in the operation machine in which the engine 201 is provided (see FIG. 12). The ON position (terminal) of the key switch 331 is connected to an input side of the ECU 311.

Connected to an input side of the ECU 311 are at least a rail pressure sensor 312 for detecting fuel pressure in the common rail 216, an electromagnetic clutch 313 for rotating or stopping the fuel supply pump 214, an engine rotation sensor 314 for detecting the rotation speed of the engine 201 (cam shaft position of crankshaft 203), an injection setter 315 for detecting and setting fuel injection times of each injector 215 (injection times during fuel injection period of one stroke), a throttle position sensor 316 for detecting an operation position of an accelerator operating tool (not shown), an intake temperature sensor 317 for detecting sucked air temperature in the intake path, an exhaust gas temperature sensor 318 for detecting temperature of exhaust gas in the exhaust gas path, a cooling water temperature sensor 319 for detecting temperature of cooling water of the engine 201, a fuel temperature sensor 320 for detecting temperature of fuel in the common rail 216, an EGR temperature sensor 321 for detecting temperature of EGR gas, the differential pressure sensor 281 for detecting differential pressure of exhaust gas before and after (downstream and upstream) of the soot filter 244 in the exhaust gas filter 202, the DPF temperature sensor 282 for detecting temperature of exhaust gas in the exhaust gas filter 202, a regeneration switch 322 as a regeneration authorization member which permits a regeneration operation of the exhaust gas filter 202, a regeneration prohibiting switch 323 as a regeneration prohibiting member for prohibiting the regeneration operation of the exhaust gas filter 202, and an interlock switch 324 for prohibiting execution of regeneration controls after the non-operation regeneration control (details will be described later) in a lock state.

At least electromagnetic solenoids of the fuel injection valves 219 for the four cylinders are respectively connected to an output side of the ECU 311. That is, the exhaust gas purification system is configured such that high pressure fuel accumulated in the common rail 216 is injected from the fuel injection valves 219 a plurality of times during one stroke while controlling fuel injection pressure, injection timing, injection period and the like, generation of nitrogen oxide (NOx) is suppressed, generation of soot, carbon dioxide (CO2) and the like are reduced, complete combustion is executed, and fuel economy is enhanced.

Figure 12:
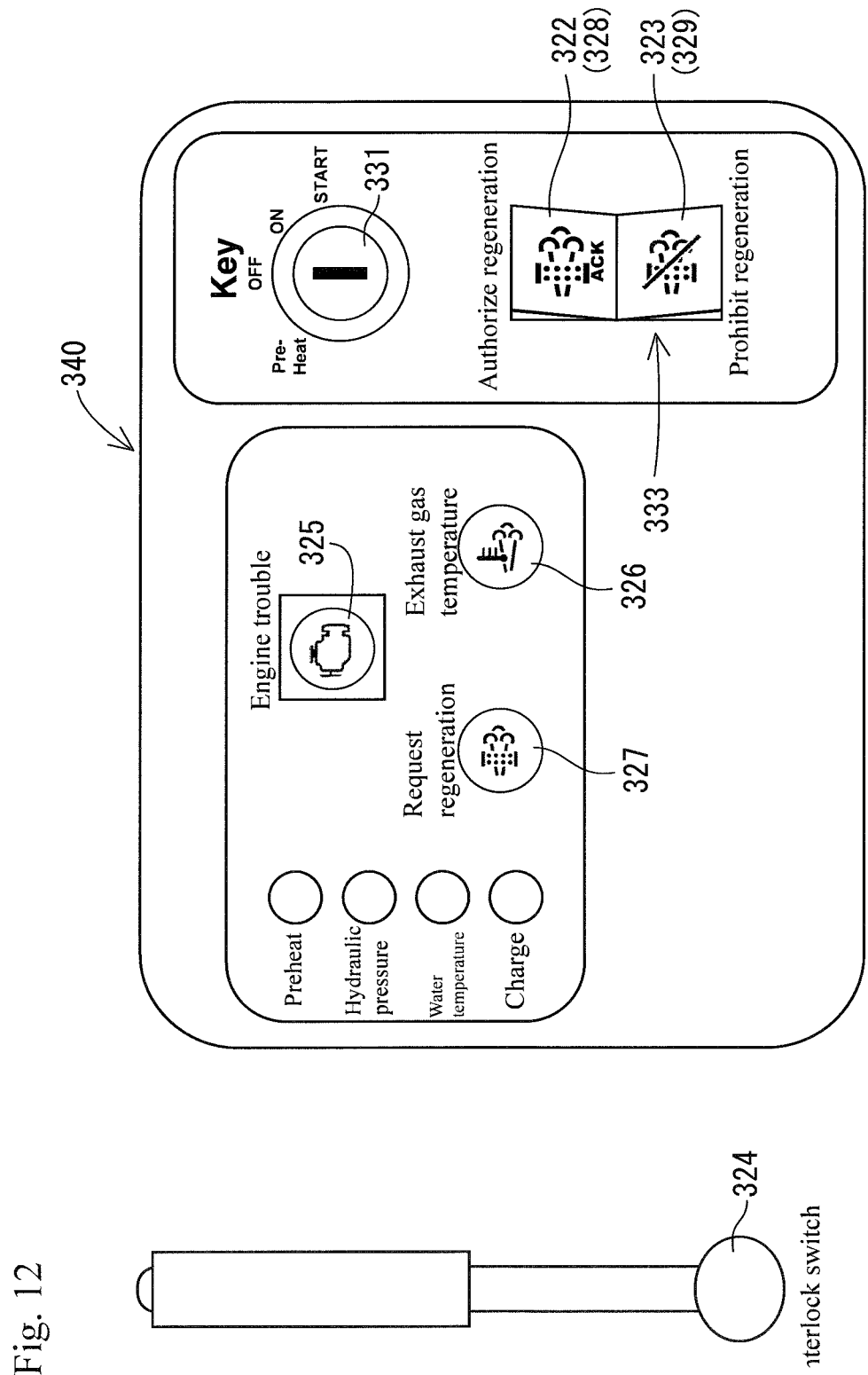
FIG. 12 is a diagram for describing an instrument panel.

Connected to an output side of the ECU 311 are the intake throttle member 228 for adjusting intake pressure (suction amount) of the engine 201, the EGR valve member 231 for adjusting a supply amount of EGR gas to the intake manifold 206, an engine alarm lamp 325 for informing of an abnormal condition of the engine 201, an exhaust gas temperature alarm lamp 326 for informing that temperature of exhaust gas is high, a regeneration request lamp 327 for inducing execution of the regeneration control after the non-operation regeneration control, a regeneration lamp 328 for blinking in association with the regeneration operation of the exhaust gas filter 202, a regeneration prohibiting lamp 329 which is operated by a prohibiting operation of the regeneration prohibiting switch 323, and a warning buzzer 330 which rumbles in association with the regeneration operation of the exhaust gas filter 202. Data sets concerning the blinking of the various kings of lamps 325 to 329 and concerning rumble of the warning buzzer 330 are previously stored in the EEPROM of the ECU 311. As shown in FIG. 12, the regeneration switch 322, the regeneration prohibiting switch 323 and the various kings of lamps 325 to 329 are placed on the instrument panel 340 existing in the operation machine in which the engine 201 is provided. The interlock switch 324 is provided on the instrument panel 340 or in the vicinity of the instrument panel 340.

As shown in FIG. 12, the regeneration switch 322 and the regeneration prohibiting switch 323 are configured as a locker switch 333 (seesaw switch) which can turn around a support shaft located at a central portion. In the locker switch 333, one of the switches sandwiching the support shaft is the regeneration switch 322, and the other switch is the regeneration prohibiting switch 323.

The regeneration switch 322 is of a momentary operation type. That is, the regeneration switch 322 is a non-lock type push switch which emits one ON pulse signal when the regeneration switch 322 is once pushed down. Operator's pushing time of the regeneration switch 322 is employed as one of criteria for determining whether regeneration controls after the reset regeneration control (details will be described later) can be executed.

The regeneration prohibiting switch 323 is of an alternate operation type. That is, the regeneration prohibiting switch 323 is a lock type push switch in which if the switch 323 is once pushed down, the switch 323 is locked at the pushed down position, and if the switch 323 is pushed down once more, the switch 323 returns to its original position. If the regeneration prohibiting switch 323 is pushed down and locked, the current driving state in the engine 201 is maintained, and execution of the regeneration controls after the reset regeneration control is prohibited. Here, an ON and OFF operation of the regeneration prohibiting switch 323 is also one of criteria for determining whether the regeneration controls after the reset regeneration control can be executed.

The regeneration lamp 328 is incorporated in the regeneration switch 322 of this embodiment. That is, a portion of the regeneration switch 322 of the locker switch 333 is configured as a switch having the regeneration lamp 328. Similarly, the regeneration prohibiting lamp 329 is incorporated in the regeneration prohibiting switch 323, and a portion of the regeneration prohibiting switch 323 of the locker switch 333 is configured as a switch having the regeneration prohibiting lamp 329. Due to characteristic of a structure of the locker switch 333, if the regeneration prohibiting switch 323 is pushed down and is turned ON, the regeneration switch 322 is turned OFF. If the regeneration prohibiting switch 323 is in a lock state, the regeneration switch 322 cannot be turned ON. If the regeneration prohibiting switch 323 is in a release state, the regeneration switch 322 can be pushed down and turned ON.

Figure 13:
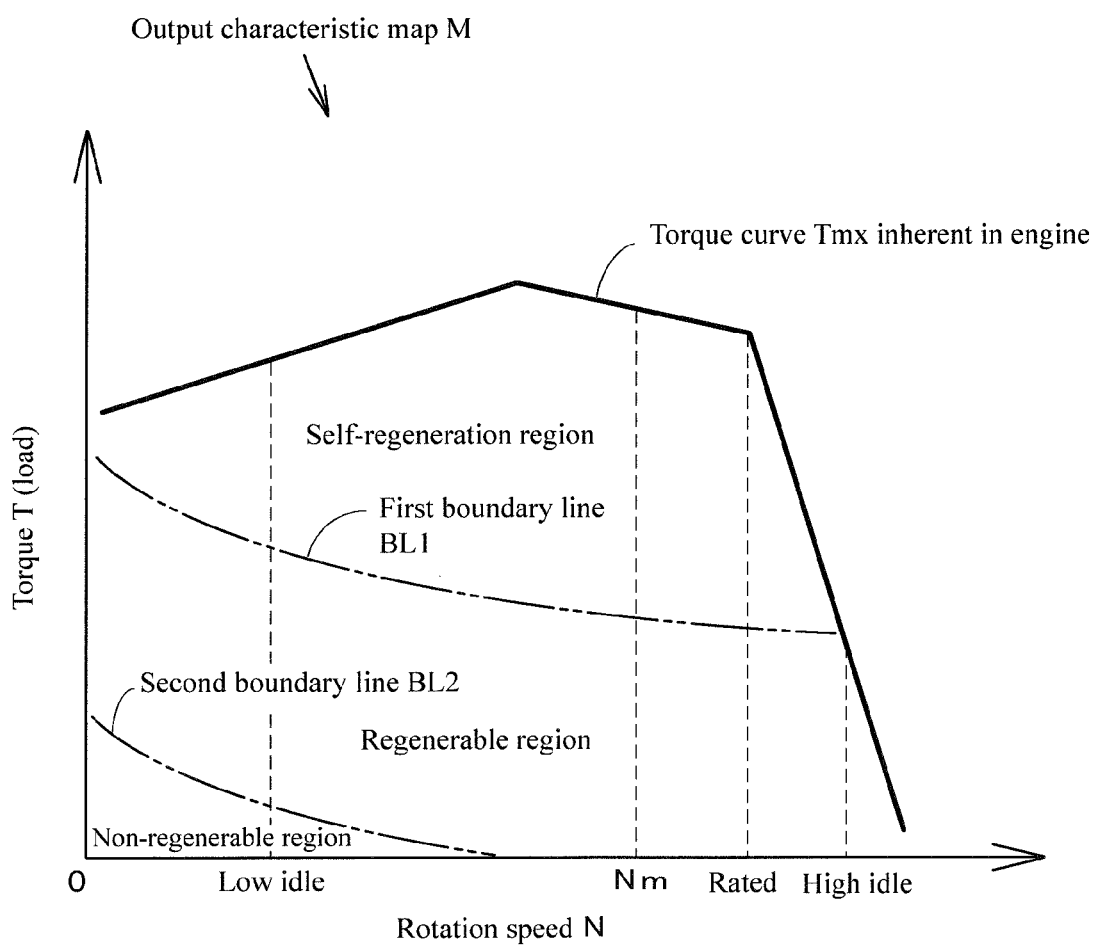
FIG. 13 is a diagram for describing an output characteristic map.

An output characteristic map M (see FIG. 13) showing a relation between rotation speed N and torque T (load) of the engine 201 is previously stored in the EEPROM of the ECU 311. Although details is omitted, an exhaust gas flow rate map for calculating an exhaust gas flow rate from a relation between the rotation speed N and a fuel injection amount of the engine 201, and a PM discharge amount map for calculating a PM discharge amount of the engine 201 from a relation between the rotation speed N and the fuel injection amount of the engine 201 are also previously stored in the EEPROM of the ECU 311. These maps such as the output characteristic map M are obtained by experiments and the like. In the output characteristic map M shown in FIG. 13, a lateral axis shows the rotation speed N and a vertical axis shows the torque T. The output characteristic map M is a region surrounded by a solid line Tmx which is convex upward. The solid line Tmx is a maximum torque line showing a maximum torque with respect to the rotation speed N. In this case, if the types of the engine 201 are the same, the output characteristic map M stored in the ECU 311 is the same (common). As shown in FIG. 13, the output characteristic map M is vertically divided into three parts by boundary lines BL1 and BL2 which show a relation between the rotation speed N and the torque T at a predetermined exhaust gas temperature.

A region higher than the first boundary line BL1 is a self-regeneration region where PM accumulated on the soot filter 244 can be oxidized and removed (oxidization effect of the diesel oxidation catalyst 243 functions) only by a normal operation of the engine 201. A region between the first boundary line BL1 and the second boundary line BL2 is a regenerable region where PM is not oxidized and removed only by the normal operation of the engine 201 and PM is accumulated on the soot filter 244, but the exhaust gas filter 202 regenerates by executing later-described assist regeneration control and the reset regeneration control. A region lower than the second boundary line BL2 is a non-regenerable region where the exhaust gas filter 202 does not regenerate even if the assist regeneration control and the reset regeneration control are executed. Since the exhaust gas temperature of the engine 201 in the non-regenerable region is excessively low, even if the assist regeneration control and the reset regeneration control are executed from this state, the exhaust gas temperature does not rise to the regeneration boundary temperature. That is, if the relation between the rotation speed N and the torque T of the engine 201 is in the non-regenerable region, the exhaust gas filter 202 does not regenerate by the assist regeneration control and the reset regeneration control (particulate matter collecting ability of soot filter 244 is not restored). The exhaust gas temperature on the first boundary line BL1 is regeneration boundary temperature (about 300° C.) at which self-regeneration can be carried out.

Basically, the ECU 311 obtains torque of the engine 201 from the rotation speed detected by the engine rotation sensor 314 and a throttle position detected by the throttle position sensor 316, the ECU 311 calculates a target fuel injection amount using the torque and the output characteristic, and executes the fuel injection control to operate the common rail device 220 based on the calculation result. The fuel injection amount of the common rail device 220 is adjusted mainly by adjusting a valve-opening period of each fuel injection valve 219 and changing injection period to the injector 215.

As control type (regeneration control type) of the engine 201, there are the normal operation control (self-regeneration control) in which the exhaust gas filter 202 spontaneously regenerates only by the normal operation of the engine 201, the assist regeneration control for automatically raising the exhaust gas temperature if the clogged state of the exhaust gas filter 202 becomes equal to or more than a prescribed standard, the reset regeneration control for raising the exhaust gas temperature using the post injection E, the non-operation regeneration control (which may also be called emergency regeneration control, parking regeneration control) for raising exhaust gas temperature by combining the post injection E and the predetermined high speed rotation speed of the engine 201, and the recovery regeneration control which can be executed when the non-operation regeneration control fails.

According to the normal operation control, the relation between the rotation speed N and the torque T in the engine 201 is in the self-regeneration region of the output characteristic map M, and the exhaust gas temperature of the engine 201 is high in such a degree that a PM oxidization amount in the exhaust gas filter 202 becomes higher than a PM collecting amount.

According to the assist regeneration control, the exhaust gas filter 202 is regenerated by the after injection D and by adjustment of the opening degree of the intake throttle member 228. That is, according to the assist regeneration control, the EGR valve member 231 is closed, and the intake throttle member 228 is closed (narrowed down) up to a predetermined opening degree, thereby limiting the amount of air sucked into the engine 201. According to this, since a load of the engine 201 increases, the fuel injection amount of the common rail device 220 increases to maintain the set rotation speed, and the exhaust gas temperature of the engine 201 rises. At the same time, the after injection D which injects fuel by slightly retarding angle with respect to the main injection A is carried out to activate the dispersion combustion, thereby raising the exhaust gas temperature of the engine 201. As a result, PM in the exhaust gas filter 202 is burned and removed. In any of the regeneration controls which are described below, the EGR valve member 231 is closed.

The reset regeneration control is carried out when the assist regeneration control fails (clogged state of exhaust gas filter 202 is not recovered and PM remains), or when accumulated driving time Tl of the engine 201 becomes equal to or more than set time Tl2 (e.g., about 100 hours). In the reset regeneration control, in addition to the mode of the assist regeneration control, the exhaust gas filter 202 is regenerated by the post injection E. That is, in the reset regeneration control, in addition to the adjustment of the opening degree of the intake throttle member 228 and the after injection D, unburned fuel is supplied directly into the exhaust gas filter 202 by the post injection E, and the unburned fuel is burned by the diesel oxidation catalyst 243, thereby raising the exhaust gas temperature in the exhaust gas filter 202 (about 560° C.). As a result, PM in the exhaust gas filter 202 is forcibly burned and removed.

The non-operation regeneration control is carried out when the reset regeneration control fails (clogged state of exhaust gas filter 202 is not recovered and PM remains). In the non-operation regeneration control, in addition to the reset regeneration control mode, the exhaust gas temperature of the engine 201 is increased by maintaining the rotation speed N of the engine 201 at predetermined high speed rotation speed (this may be 2200 rpm, highest rotation speed or high idle rotation speed) and then, the exhaust gas temperature is increased by the post injection E also in the exhaust gas filter 202 (about 600° C.). As a result, PM in the exhaust gas filter 202 is forcibly burned and removed under a condition which is better than the reset regeneration control. The intake throttle member 228 in the non-operation regeneration control is completely closed instead of being narrowed down. The after injection D in the non-operation regeneration control is carried out while retarding angle largely than the assist regeneration control and the reset regeneration control.

In the non-operation regeneration control, output of the engine 201 is limited to the maximum output at the time of non-operation which is lower than the maximum output of the engine 201 (about 80% of maximum output for example). In this case, since the rotation speed N of the engine 201 is maintained at the predetermined high speed rotation speed, the fuel injection amount of the common rail device 220 is adjusted such that the torque T is suppressed and the output becomes the maximum output at the time of non-operation.

The recovery regeneration control is carried out when the non-operation regeneration control fails (clogged state of exhaust gas filter 202 is not recovered and PM is excessively accumulated). The recovery regeneration control of this embodiment is executed in two stages, i.e., recovery first regeneration control and recovery second regeneration control. In the recovery first regeneration control, under a situation where there is fear of runaway combustion of excessively accumulated PM, and PM in the exhaust gas filter 202 is gradually burned and removed, thereby gently regenerating the exhaust gas filter 202. In the recovery second regeneration control, when the fear of runaway combustion disappears, the exhaust gas filter 202 is swiftly regenerated.

The entire recovery regeneration control is carried out basically in the same manner as the non-operation regeneration control. To prevent the runaway combustion of excessively accumulated PM, a fuel injection amount in the post injection E is reduced for example, exhaust gas temperature in the exhaust gas filter 202 is brought close to temperature TP3 (e.g., about 500° C.) as target temperature which is lower than the non-operation regeneration control while taking a long time (e.g., within about 3 to 3.5 hours), and PM in the exhaust gas filter 202 is gradually burned and removed. In the recovery first regeneration control, output of the engine 201 is limited to maximum output at the time of recovery which is lower than maximum output at the time of non-operation (e.g., about 80% of maximum output). In this case, not only torque T of the engine 201 but also rotation speed N are suppressed, and a fuel injection amount of the common rail device 220 is adjusted to the maximum output at the time of recovery.

In the recovery second regeneration control, the exhaust gas filter 202 is swiftly regenerated while setting the exhaust gas temperature in the exhaust gas filter 202 to temperature TP4 (e.g., about 600° C.) which is higher than the recovery first regeneration control by valve-opening of the intake throttle member 228, the after injection D, the post injection E and predetermined high speed rotation speed of the engine 201. That is, the mode of the recovery second regeneration control is the same as that of the non-operation regeneration control. A main difference between the recovery first regeneration control and the recovery second regeneration control is injection amounts of the post injection E. For example, the injection amount of the post injection E at the time of the recovery first regeneration control is smaller than that of the post injection E at the time of the recovery second regeneration control.

In the normal operation control as a matter of course, but also in the assist regeneration control and the reset regeneration control, power of the engine 201 can be transmitted to an operation portion of the an operation machine to execute various operations (engine 201 can be driven by normal operation). In the non-operation regeneration control and the recovery regeneration control, the engine 201 is driven exclusively for burning and removing PM, and power of the engine 201 does not drive the operation portion of the operation machine for example.

(5). Mode of Exhaust Gas Filter Regeneration Control

Next, one example of regeneration control of the exhaust gas filter 202 carried out by the ECU 311 will be described with reference to flowcharts in FIG. 14 and subsequent drawings. The above-described regeneration controls are executed based on a command of the ECU 311. That is, algorithms shown in the flowcharts FIG. 14 and subsequent drawings are stored in the EEPROM of the ECU 311, the algorithms are called into the RAM and then, the algorithms are processed by the CPU, thereby executing the regeneration controls.

Figure 14:
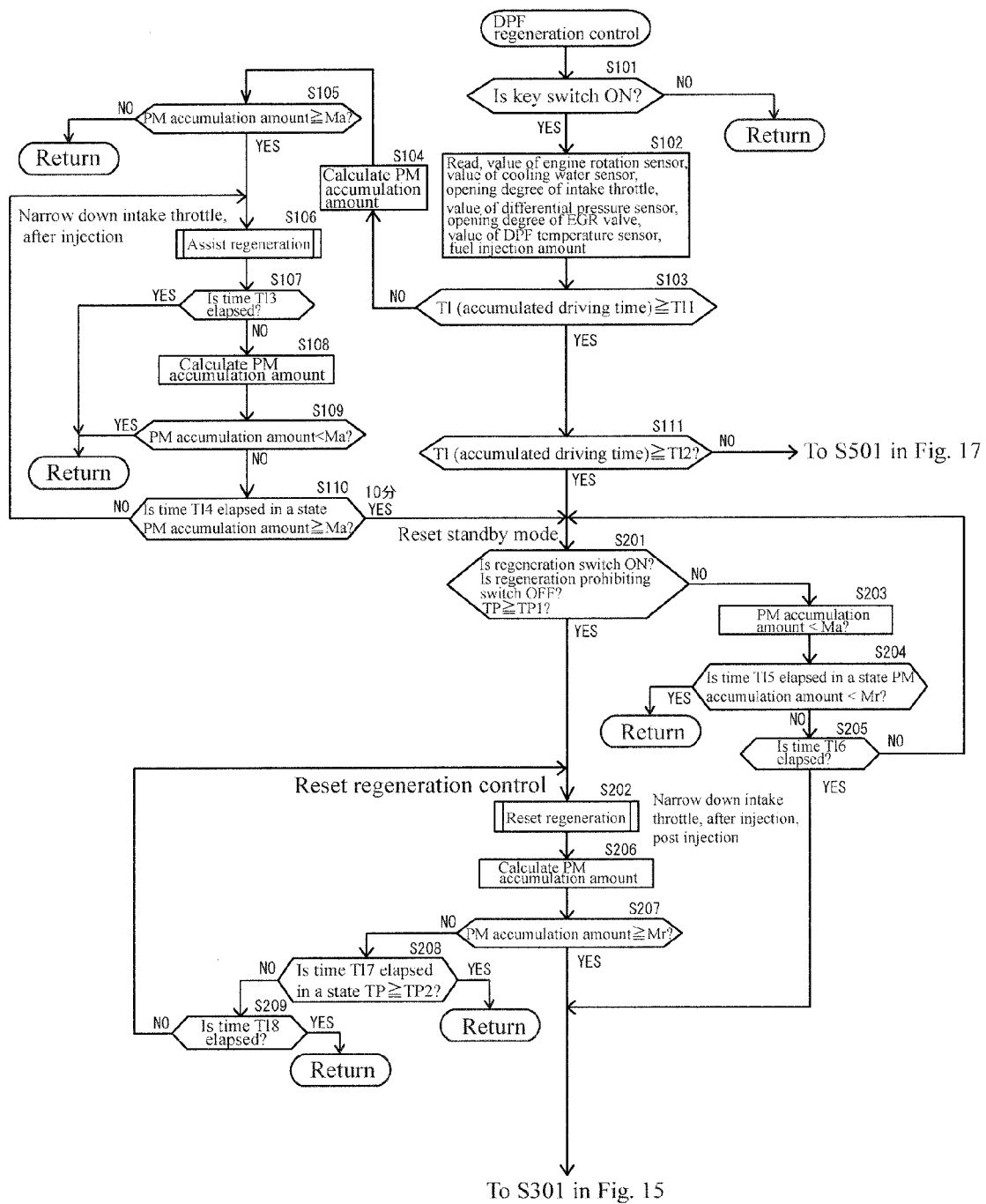
FIG. 14 is a flowchart of assist regeneration control and reset regeneration control.

As shown in FIG. 14, in the regeneration control of the exhaust gas filter 202, if the key switch 331 is ON (S101: YES), detection values of the engine rotation sensor 314, the cooling water temperature sensor 319, the differential pressure sensor 281 and the DPF temperature sensor 282; opening degrees of the intake throttle member 228 and the EGR valve member 231; and a fuel injection amount of the common rail device 220 are read (S102). Next, the accumulated driving time Tl elapsed after the assist regeneration control, the reset regeneration control or the non-operation regeneration control were executed in past times is less than set time Tl1 (e.g., 50 hours) (S103; NO), the PM accumulation amount in the exhaust gas filter 202 is estimated (S104). In step S104, PM accumulation amount estimation by a P method based on a detection value of the differential pressure sensor 281 and an exhaust gas flow rate map, and PM accumulation amount estimation by a C method based on a detection value of the engine rotation sensor 314, fuel injection amount, the PM discharge amount map, and the exhaust gas flow rate map are carried out. If any of the PM accumulation amounts by the P method and the C method is equal to or more than a prescribed amount Ma (e.g., 8 g/l) (S105; YES), the assist regeneration control is executed (S106).

If predetermined time Tl3 (e.g., 30 minutes) is elapsed after the assist regeneration control is started (S107: YES), the assist regeneration control is completed, and control is returned to normal operation control. If time elapsed after the assist regeneration control is started is within predetermined time (S107: NO), the PM accumulation amount in the exhaust gas filter 202 is estimated by the C method (S108). As can be found from this point, in this embodiment, basically, the PM accumulation amount is estimated by the C method during execution of the regeneration control, and the PM accumulation amount is estimated by the P method during non-execution of the regeneration control. The estimation method of the PM accumulation amount is changed depending upon whether the regeneration control is being executed. If the PM accumulation amount by the C method is less than the prescribed amount Ma (e.g., 6 g/l) (S109: YES), the assist regeneration control is completed, and control is returned to the normal operation control. When any of the PM accumulation amounts by the P method and C method is equal to or more than the prescribed amount Ma (S109: NO), if predetermined time Tl4 (e.g., 10 minutes) is elapsed in this state (S110: YES), the procedure is shifted to step S201 which is a reset standby mode before the reset regeneration control.

The procedure is returned to step S103, and if the accumulated driving time Tl is equal to or more than set time Tl1 and is equal to or more than set time Tl2 (e.g., 100 hours) (S111: YES), the procedure is shifted to step S201 which is a reset standby mode. In this stage, the regeneration lamp 328 blinks to induce an operator to execute the reset regeneration control. When the regeneration prohibiting switch 323 is OFF and the regeneration switch 322 is ON for predetermined time (e.g., 3 seconds), if the exhaust gas temperature TP in the exhaust gas filter 202 is equal to or more than TP1 (e.g., 250° C.) (S201: YES), the reset regeneration control is executed (S202). In this stage, the regeneration lamp 328 and the exhaust gas temperature alarm lamp 326 lights up.

When the regeneration prohibiting switch 323 is ON or the regeneration switch 322 is OFF or the exhaust gas temperature TP in the exhaust gas filter 202 is less than TP1 (S201: NO), the PM accumulation amount in the exhaust gas filter 202 is estimated by the C method (S203), and if predetermined time Tl5 (e.g., 1 hour) in a state where the PM accumulation amount by the C method is less than a prescribed amount Mr (e.g., 6 g/t) is elapsed (S204: YES), the procedure is shifted from the reset standby mode and is returned into the normal operation control. When predetermined time Tl6 (e.g., 3 hours) is elapsed in a state where step S204 is NO (S205: YES), since there is concern that PM may be excessively accumulated, the procedure is shifted to step S301 which is a non-operation standby mode before the non-operation regeneration control.

During execution of the reset regeneration control, the PM accumulation amount in the exhaust gas filter 202 is estimated by the P method and the C method (S206). If any of the PM accumulation amounts by the P method and the C method is less than the prescribed amount Mr (e.g., 10 g/l) (S207: NO), and if predetermined time Tl7 (e.g., 25 minutes) is elapsed in a state where the exhaust gas temperature TP in the exhaust gas filter 202 is equal to or more than TP2 (e.g., 600° C.), and if predetermined time Tl8 (e.g., 30 minutes) is elapsed after the reset regeneration control is started (S209: YES), the reset regeneration control is completed and control is returned to the normal operation control. If any of the PM accumulation amounts by the P method and the C method is equal to or more than a prescribed amount Mr (S207: YES), it is regarded that the reset regeneration control fails, and since there is concern that PM may be excessively accumulated, the procedure is shifted to step S301 which is the non-operation standby mode before the non-operation regeneration control.

Figure 15:
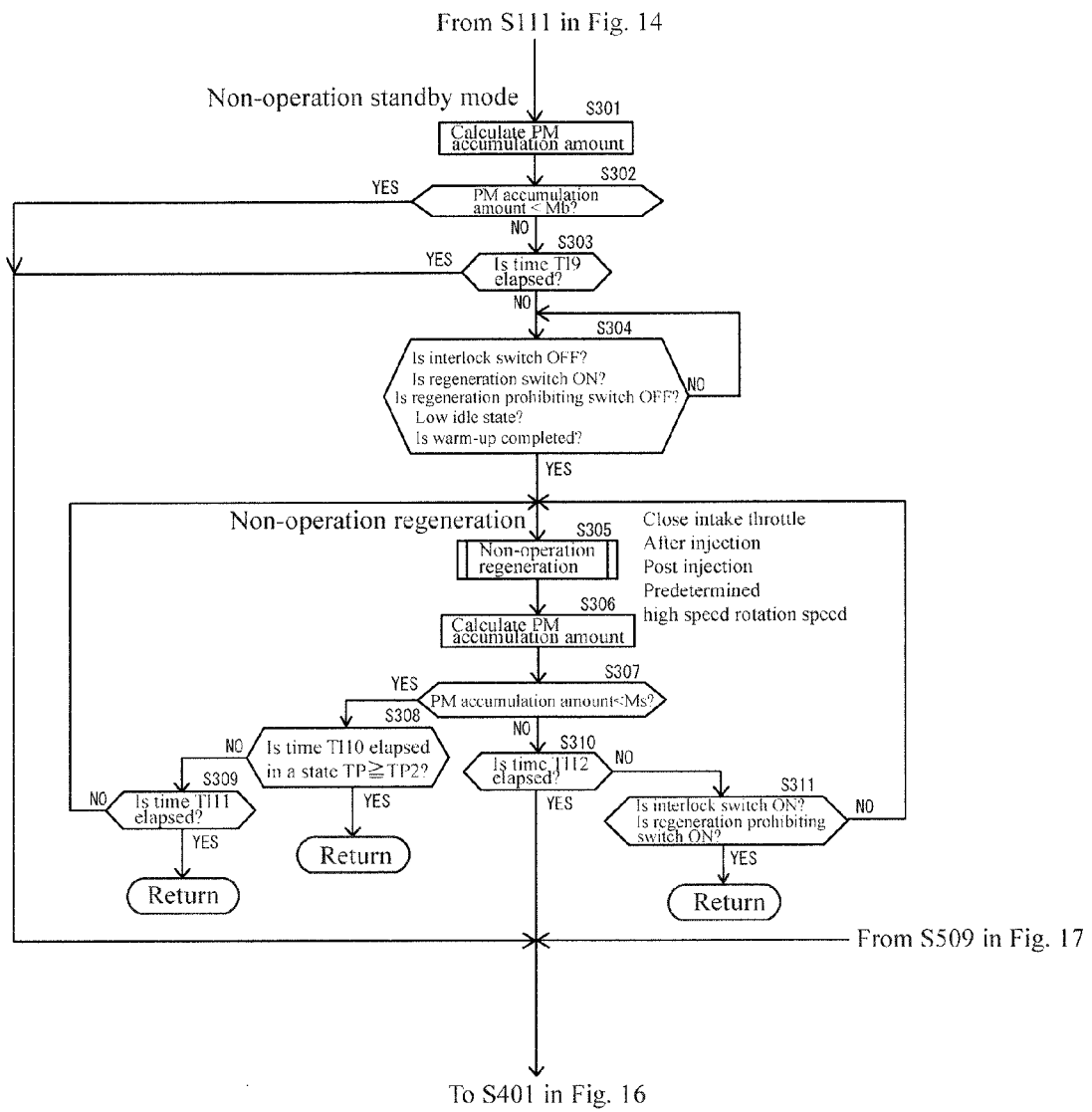
FIG. 15 is a flowchart of a non-operation regeneration control.

As shown in FIG. 15, in the non-operation standby mode, the PM accumulation amount in the exhaust gas filter 202 is estimated by the P method and the C method (S301). In this stage, the engine alarm lamp 325 and the regeneration request lamp 327 light up to give notice to an operator that the non-operation regeneration control will be executed. If any of the PM accumulation amounts by the P method and the C method is less than a prescribed amount Mb (e.g., 12 g/l) (S302: NO) and time is within predetermined time Tl9 (e.g., 10 hours) (S303: NO), the procedure is brought into a standby state until the preset non-operation shifting condition is established (S304). When any of the PM accumulation amounts by the P method and the C method is equal to or more than the prescribed amount Mb (S302: YES) and predetermined time Tl9 (e.g., 10 hours) is elapsed while keeping the non-operation standby mode (S303: YES), since there is concern that PM is excessively accumulated, the procedure is shifted to step S401 which is the recovery standby mode before the recovery regeneration control. In the non-operation standby mode, if the PM accumulation amount is less than 10 g/l for example, the warning buzzer 330 intermittently rumbles, and if the PM accumulation amount is equal to or more than 10 g/l, the warning buzzer 330 continuously rumbles. By the rumbling of the warning buzzer 330, the operator can roughly understand a clogging degree of the exhaust gas filter 202.

The non-operation shifting condition shown in step S304 includes five conditions (i.e., interlock switch 324 is in release state (OFF), regeneration switch 322 is ON for predetermined time (e.g., 3 seconds), regeneration prohibiting switch 323 is OFF, engine 201 is at low idle rotation speed (minimum rotation speed when there is no load), and detection value of cooling water temperature sensor 319 is equal to or more than predetermined value (e.g., 65° C.)). In this case, the detection value of the cooling water temperature sensor 319 is equal to or more than a predetermined value, it is regarded that a warm-up operation of the engine 201 is completed.

In step S304, if three conditions, i.e., the interlock switch 324 is in the release state (OFF), the engine 201 is at low idle rotation speed, and a detection value of the cooling water temperature sensor 319 is equal to or more than a predetermined value are established, light up of the engine alarm lamp 325 and the regeneration request lamp 327 are continued and in this state, the regeneration lamp 328 blinks, thereby giving notice to an operator that the non-operation regeneration control should be executed. If the regeneration prohibiting switch 323 is OFF and the regeneration switch 322 is ON for predetermined time (S304: YES), the five non-operation shifting conditions are established, and the non-operation regeneration control is executed (S305). In this state, the engine alarm lamp 325 and the regeneration request lamp 327 are turned OFF, and the exhaust gas temperature alarm lamp 326 lights up together the regeneration lamp 328.

During execution of the non-operation regeneration control, a PM accumulation amount in the exhaust gas filter 202 is estimated by the C method (S306). If the PM accumulation amount by the C method is less than the prescribed amount Ms (e.g., 8 g/l) (S307: YES) and exhaust gas temperature TP in the exhaust gas filter 202 is equal to or more than TP2 (e.g., 600° C.) and predetermined time Tl10 (e.g., 25 minutes) is elapsed (S308: YES) and predetermined time Tl11 (e.g., 30 minutes) is elapsed after the non-operation regeneration control is started (S309: YES), the non-operation regeneration control is completed and control is returned to the normal operation control. When the PM accumulation amount is equal to or more than the prescribed amount Ms (S307: YES), if predetermined time Tl12 (e.g. 30 minutes) is elapsed in this state (S310: YES), it is regarded that the non-operation regeneration control fails, and since there is concern that PM may be excessively accumulated, the procedure is shifted to the step S401 which is the recovery standby mode before the recovery regeneration control.

If the interlock switch 324 is brought into a lock state (ON) or the regeneration prohibiting switch 323 is turned ON during execution of the non-operation regeneration control (S311: YES), the non-operation regeneration control is interrupted. In this state, the engine alarm lamp 325 and the regeneration request lamp 327 light up, and the regeneration lamp 328 blinks. If the regeneration prohibiting switch 323 is ON, the regeneration prohibiting lamp 329 also lights up. When the non-operation regeneration control is interrupted, if the regeneration switch 322 is turned ON, the non-operation regeneration control is restarted.

Figure 16:
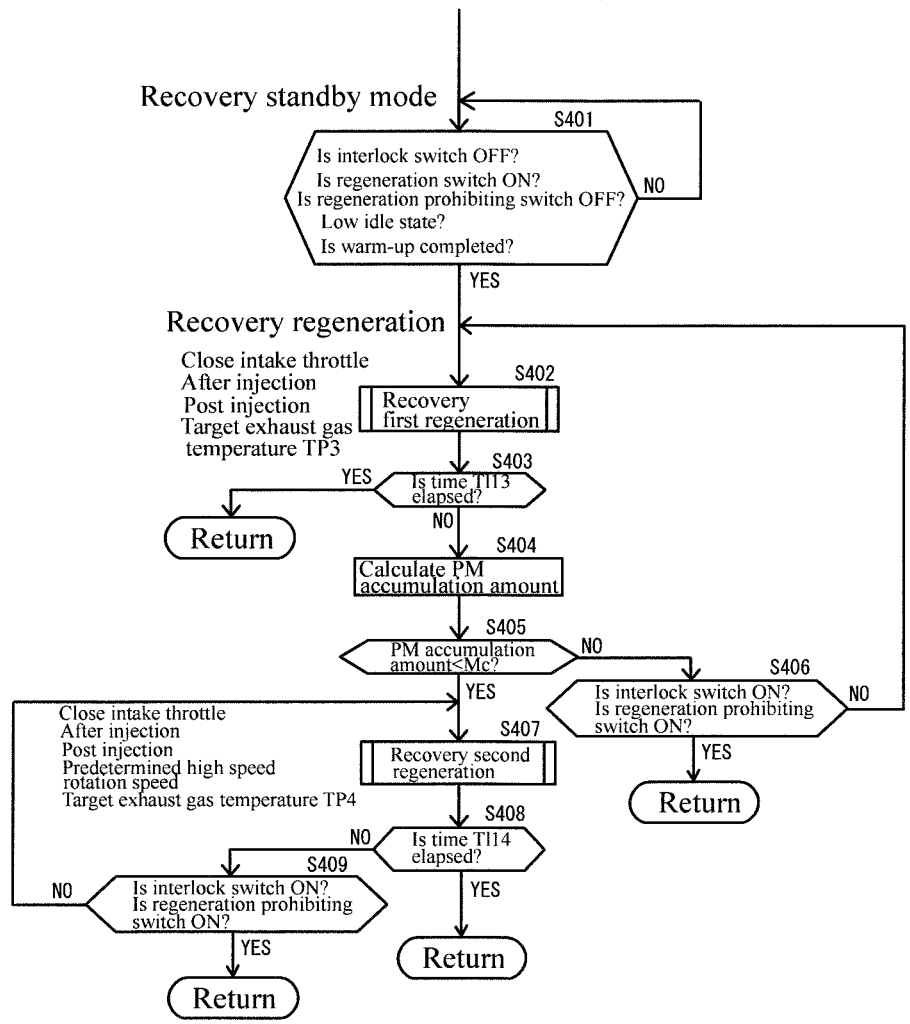
FIG. 16 is a flowchart of recovery regeneration control.

As shown in FIG. 16, in the recovery standby mode, the procedure is brought into the standby state until the preset recovery shifting condition is established (S401). In this stage, like the non-operation standby mode, the engine alarm lamp 325 and the regeneration request lamp 327 light up, and notice is given to an operator that the recovery regeneration control should be executed. The recovery shifting condition shown in step S401 is basically the same as the non-operation shifting condition, but pushing-down time of the regeneration switch 322 is longer than that of the non-operation shifting condition. That is, the recovery shifting conditions includes five conditions (i.e., interlock switch 324 is in the release state (OFF), regeneration switch 322 is ON for predetermined time (e.g., 10 seconds), regeneration prohibiting switch 323 is OFF, engine 201 is at low idle rotation speed (minimum rotation speed when there is no load), and detection value of cooling water temperature sensor 319 is equal to or more than predetermined value (e.g., 65° C.)). In this case also, if the detection value of the cooling water temperature sensor 319 is equal to or more than a predetermined value, it is regarded that a warm-up operation of the engine 201 is completed.

In step S401, if three conditions, i.e., the interlock switch 324 is in the release state (OFF), the engine 201 is at low idle rotation speed, and a detection value of the cooling water temperature sensor 319 is equal to or more than a predetermined value are established, light up of the engine alarm lamp 325 and the regeneration request lamp 327 are continued and in this state, and the regeneration lamp 328 blinks, thereby giving notice to an operator that the reset regeneration control should be executed. If the regeneration prohibiting switch 323 is OFF and the regeneration switch 322 is ON for predetermined time (401: YES), the five recovery shifting conditions are established, and the recovery first regeneration control is executed (S402). In this state, the engine alarm lamp 325 and the regeneration request lamp 327 are turned OFF, and the exhaust gas temperature alarm lamp 326 lights up together the regeneration lamp 328.

During execution of the recovery first regeneration control, the PM accumulation amount in the exhaust gas filter 202 is estimated by the C method (S404), and if the PM accumulation amount by the C method becomes less than a prescribed amount Mc (e.g., about 8 to 10 g/l) (S405: YES), the procedure is shifted to the recovery second regeneration control (S407). During execution of the recovery first regeneration control, if the interlock switch 324 is brought into the lock state (ON) or the regeneration prohibiting switch 323 is turned ON (S406: YES), the recovery first regeneration control is interrupted. In this stage, the engine alarm lamp 325 and the regeneration request lamp 327 light up, and the regeneration lamp 328 is turned OFF. If the regeneration prohibiting switch 323 is ON, the regeneration prohibiting lamp 329 also lights up. When the recovery first regeneration control is interrupted, if the regeneration switch 322 is turned ON, the recovery first regeneration control is restarted. If the PM accumulation amount by the C method is not reduced less than the prescribed amount Mc (S405: NO) and predetermined time Tl13 (e.g., about 3 to 3.5 hours) is elapsed after the recovery first regeneration control is started (S403: YES), it is determined that regeneration of the exhaust gas filter 202 is difficult even if the recovery regeneration control is continued any longer, and the procedure is returned. In this state, a warning is output and the engine is stopped.

In the recovery second regeneration control, if predetermined time Tl14 (e.g., 30 minutes) is elapsed after the recovery second regeneration control is started (S408: YES), the recovery second regeneration control is completed and control is returned to the normal operation control. If the interlock switch 324 is brought into the lock state (ON) or the regeneration prohibiting switch 323 is turned ON during execution of the recovery second regeneration control (S409: YES), the recovery second regeneration control is interrupted. In this stage also, the engine alarm lamp 325 and the regeneration request lamp 327 light up and the regeneration lamp 328 blinks. If the regeneration prohibiting switch 323 is ON, the regeneration prohibiting lamp 329 also lights up. When the recovery second regeneration control is interrupted, if the regeneration switch 322 is turned ON, the recovery second regeneration control is restarted.

Figure 17:
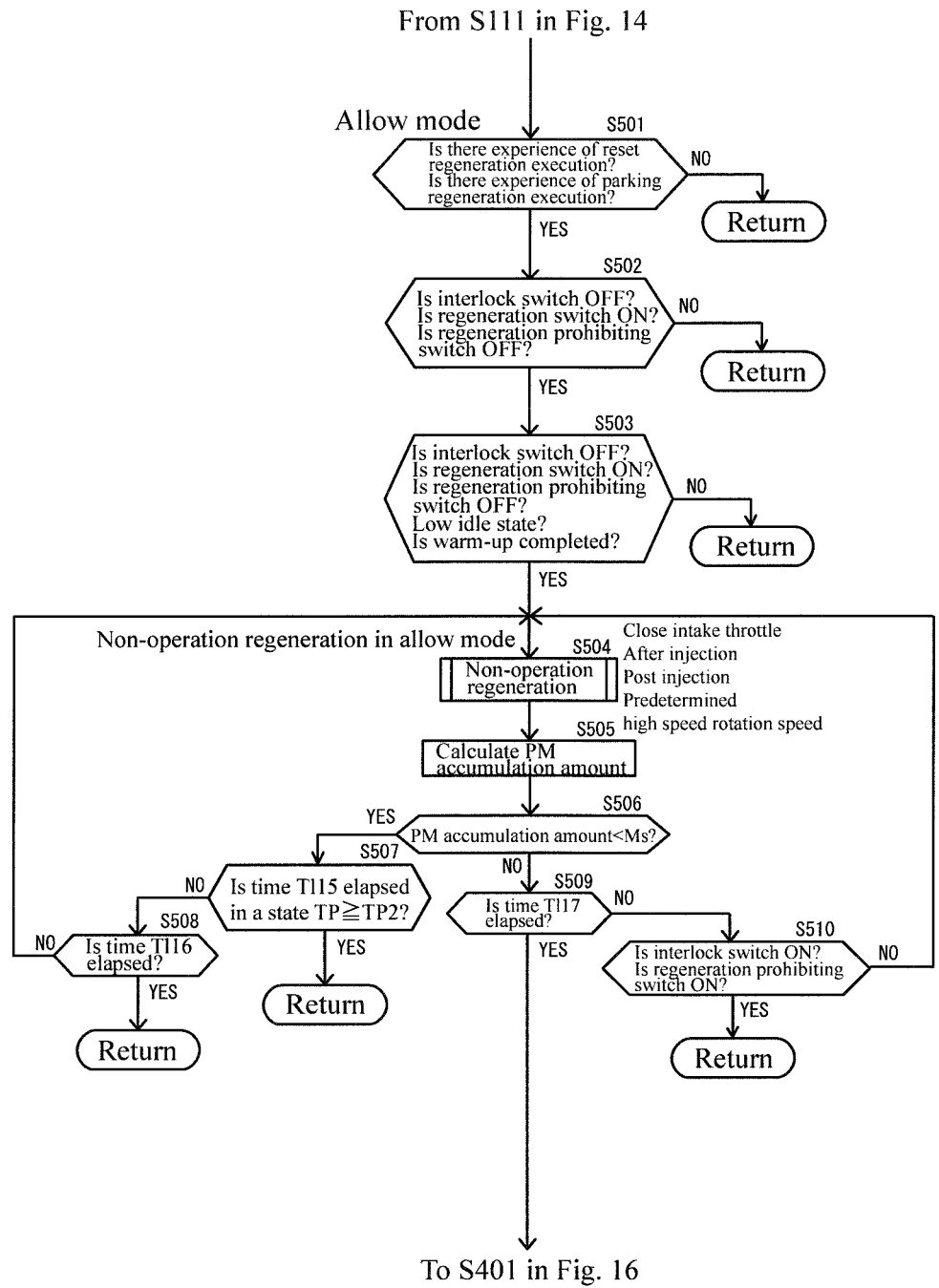
FIG. 17 is a flowchart of non-operation regeneration control in an allow mode.

In the regeneration control of the exhaust gas filter 202 of this embodiment, if set time Tl1 (e.g., 50 hours) is elapsed after the reset regeneration control or non-operation regeneration control is executed, an allow mode capable of executing the non-operation regeneration control without through the reset regeneration control is set. In S111 in FIG. 14, if the accumulated driving time Tl is equal to or more than the set time Tl1 and equal to or less than Tl2 (S111: NO), the procedure is shifted to step S501 (see FIG. 17). In step S501, if the reset regeneration control or the non-operation regeneration control is already executed (S501: YES), the regeneration request lamp 327 lights up and the regeneration lamp 328 blinks, thereby giving notice that the allow mode capable of executing the non-operation regeneration control without through the reset regeneration control can be executed. Unlike the non-operation standby mode, the engine alarm lamp 325 does not light up. If the interlock switch 324 is in the release state (OFF) and the regeneration prohibiting switch 323 is OFF and the regeneration switch 322 is ON for predetermined time (e.g., 10 seconds) (S502: YES), the allow mode is brought into the standby state (S503).

In step S503, if the five conditions (i.e., interlock switch 324 is in release state (OFF), regeneration switch 322 is ON for predetermined time (e.g., 3 seconds), regeneration prohibiting switch 323 is OFF, engine 201 is at low idle rotation speed (minimum rotation speed when there is no load), and detection value of cooling water temperature sensor 319 is equal to or more than predetermined value (e.g., 65° C.)) (S503: YES), the non-operation regeneration control in the allow mode is executed (S504). In this stage, the regeneration request lamp 327 is turned OFF, and the exhaust gas temperature alarm lamp 326 lights up together with the regeneration lamp 328.

A mode of the non-operation regeneration controls (S504 to S510) in the allow mode are basically the same as the non-operation regeneration controls (S305 to S311) when they are carried out through the reset regeneration control. When the PM accumulation amount by the C method is equal to or more than the prescribed amount Ms (S506: YES), if predetermined time Tl17 (e.g., 30 minutes) is elapsed in this state (S509: YES), it is recognized that the non-operation regeneration control in the allow mode fails, and since there is concern that the PM may be excessively accumulated, the procedure is shifted to step S401 which is a recovery standby mode before the recovery regeneration control in the same manner. If such control is employed, an operator can intentionally execute the non-operation regeneration control, PM in the exhaust gas filter 202 can be burned and removed, and maintenance performance of the exhaust gas filter 202 can be enhanced.

(6). Summary

Figure 10:
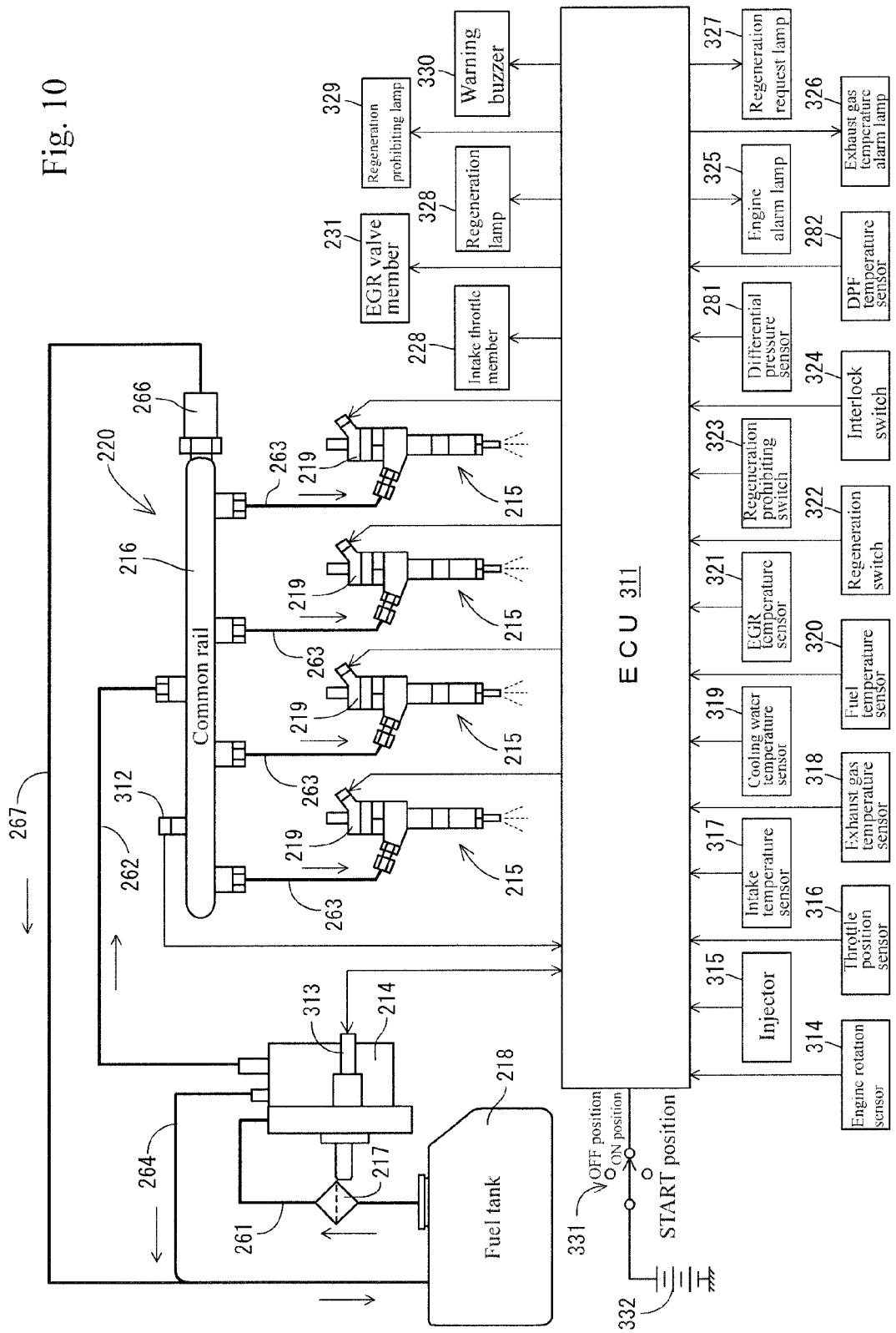
FIG. 10 is a diagram for describing a fuel system of the engine.
Figure 11:
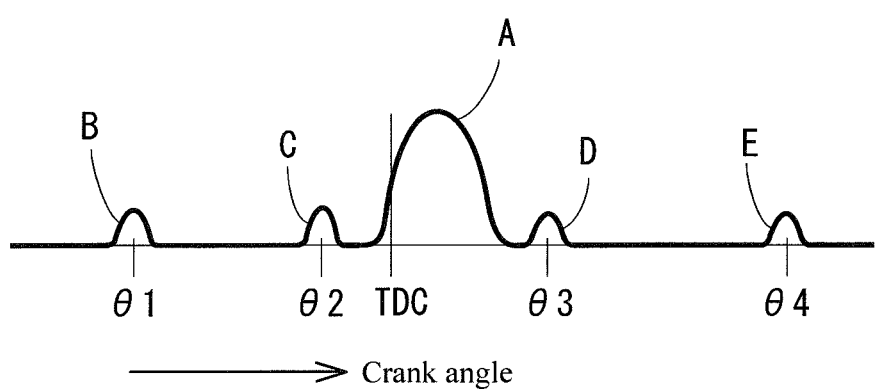
FIG. 11 is a diagram for describing injection timing of fuel.

As apparent from the above description and FIGS. 10, 15 and 16, an exhaust gas purification system including a common rail engine 201, and an exhaust gas purification device 202 placed in an exhaust gas path of the engine 201, in which the exhaust gas purification system can execute a plurality of regeneration controls for burning and removing particulate matter accumulated in the exhaust gas purification device 202, wherein the plurality of regeneration controls include at least non-operation regeneration control for raising exhaust gas temperature by combining post injection E and predetermined high speed rotation speed, and recovery regeneration control which can be executed when the non-operation regeneration control fails, in the non-operation regeneration control and the recovery regeneration control, the engine 201 is driven exclusively for burning and removing the particulate matter, and the recovery regeneration control is carried out at exhaust gas temperature lower than that of the non-operation regeneration control while taking time longer than that of the non-operation regeneration control. Therefore, even if the particulate matter is excessively accumulated in the exhaust gas purification device 202, it is possible to burn and remove the particulate matter without generating runaway combustion. Thus, it is possible to prevent the exhaust gas purification device 202 from being damaged (adversely dissolved), and to prevent emission from being excessively discharged.

When the non-operation regeneration control fails, procedure is shifted to a recovery standby mode for waiting establishment of a preset recovery shifting condition (see S401 in FIG. 16), and when the recovery shifting condition is not established, the procedure waits in the recovery standby mode. In addition, during execution of the recovery regeneration control, when a preset recovery releasing condition (see S406 and S409 in FIG. 16) is established, the recovery regeneration control is interrupted. If the procedure is once shifted to the recovery standby mode, the procedure is shifted only to the recovery regeneration control or the recovery standby mode thereafter. Therefore, regeneration control which may cause the runaway combustion is not executed, and it is possible to prevent the runaway combustion from generating.

Further, when the recovery regeneration control is completed, the control is returned to the normal operation control. Therefore, it is unnecessary for an operator to carry out the return operation for switching the modes. Hence, time and labor can be saved, and an operator's operation load can be reduced.

As apparent from the above description and FIGS. 10, 14 and 16, the exhaust gas purification system includes a common rail engine 201, and an exhaust gas purification device 202 placed in an exhaust gas path of the engine 201, in which the exhaust gas purification system can execute a plurality of regeneration controls for burning and removing particulate matter accumulated in the exhaust gas purification device. The plurality of regeneration controls include at least reset regeneration control for raising exhaust gas temperature using the post injection E, non-operation regeneration control for raising exhaust gas temperature by combining the post injection E and predetermined high speed rotation speed, and recovery regeneration control which can be executed when the non-operation regeneration control fails. In the non-operation regeneration control and the recovery regeneration control, the engine is driven exclusively for burning and removing the particulate matter. Therefore, under the non-operation regeneration control and the recovery regeneration control, the engine 201 is not normally operated. That is, the non-operation regeneration control and the recovery regeneration control exist as modes for avoiding a crisis to prevent the exhaust gas purification device 202 from being damaged (adversely dissolved) and to prevent emission from being discharged.

On that basis, the exhaust gas purification system is set such that the reset regeneration control is shifted to the recovery regeneration control through the non-operation regeneration control, and when the reset regeneration control is shifted to the non-operation regeneration control, the procedure is shifted through the non-operation standby mode for waiting for establishment of the preset non-operation shifting condition (see S304 in FIG. 15), and when the non-operation regeneration control is shifted to the recovery regeneration control, the procedure is shifted through the recovery standby mode for waiting for establishment of the preset recovery shifting condition (see S401 in FIG. 16), and when the shifting conditions are not established, the procedure waits in the standby modes. Therefore, if the procedure is once shifted to each standby mode, the control is shifted only to the non-operation regeneration control or the recovery regeneration control. Hence, it is possible to prevent the runaway combustion from being generated without executing regeneration control which causes runaway combustion, generation of the runaway combustion can be prevented, and it is possible to reliably avoid a crisis to prevent the exhaust gas purification device 202 from being damaged (adversely dissolved) and to prevent emission from being excessively discharged.

Further, in the non-operation regeneration control, output of the engine 201 is limited to maximum output at the time of non-operation which is lower than maximum output, and in the recovery regeneration control, output of the engine 201 is limited to maximum output at the time of recovery which is lower than the maximum output at the time of non-operation. Therefore, when the non-operation regeneration control or the recovery regeneration control is executed, it is possible to prevent temperature and pressure of exhaust gas from excessively raising, to prevent the exhaust system parts such as the exhaust gas purification device 202 from being deteriorated caused by temperature raising, and to prevent exhaust gas from leaking from bonded portions of the exhaust system parts caused by pressure raising.

(7). Others

The invention of the present application is not limited to the above-described embodiment, and the invention can be embodied into various modes. For example, although the exhaust gas purification system of the embodiment includes both the regeneration switch 322 and the regeneration prohibiting switch 323, the invention is not limited to this configuration. Even if the regeneration prohibiting switch 323 is omitted and only the regeneration switch 322 is provided, the same control as the above-described embodiment can be executed.

Figure 18:
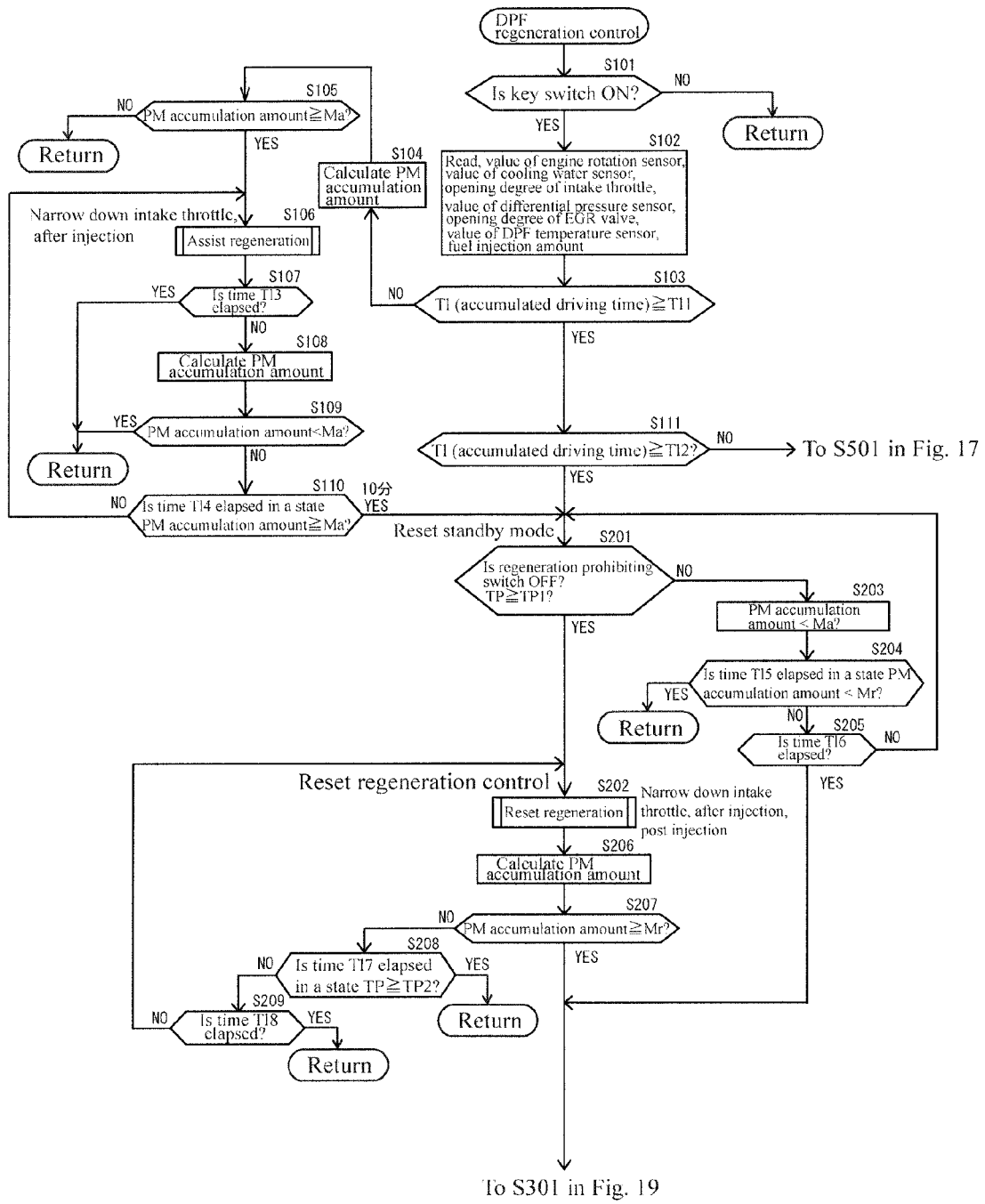
FIG. 18 is a flowchart of assist regeneration control and reset regeneration control in another example from which a regeneration switch is omitted.
Figure 19:
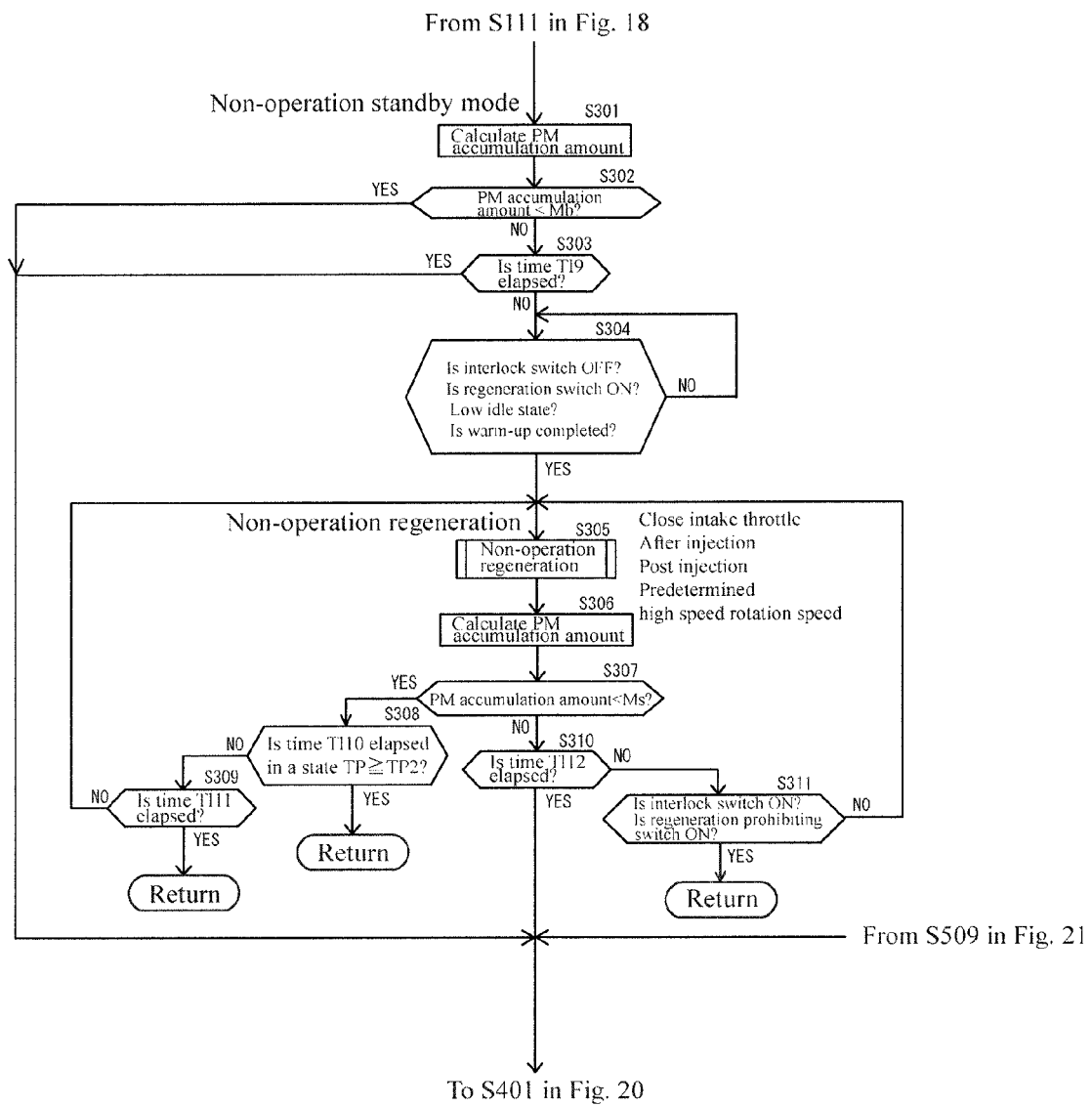
FIG. 19 is a flowchart of non-operation regeneration control in another example from which a regeneration switch is omitted.
Figure 20:
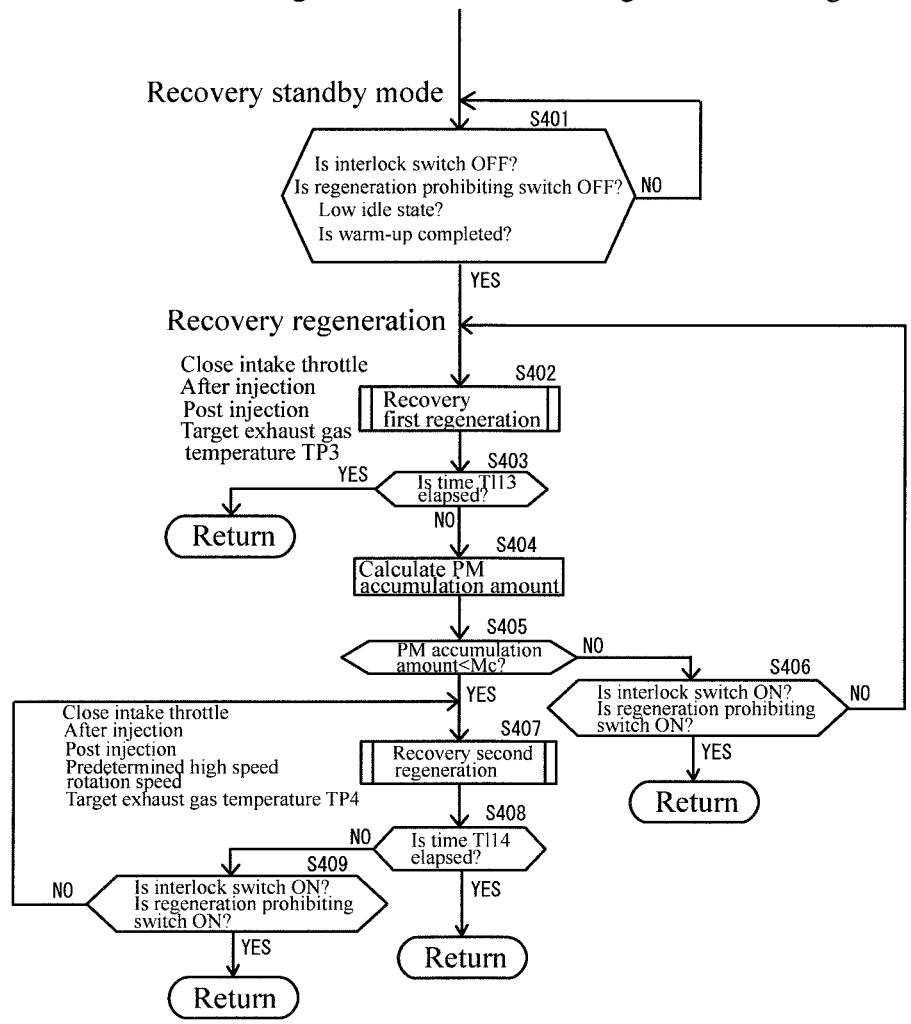
FIG. 20 is a flowchart of recovery regeneration control in another example from which the regeneration switch is omitted.
Figure 21:
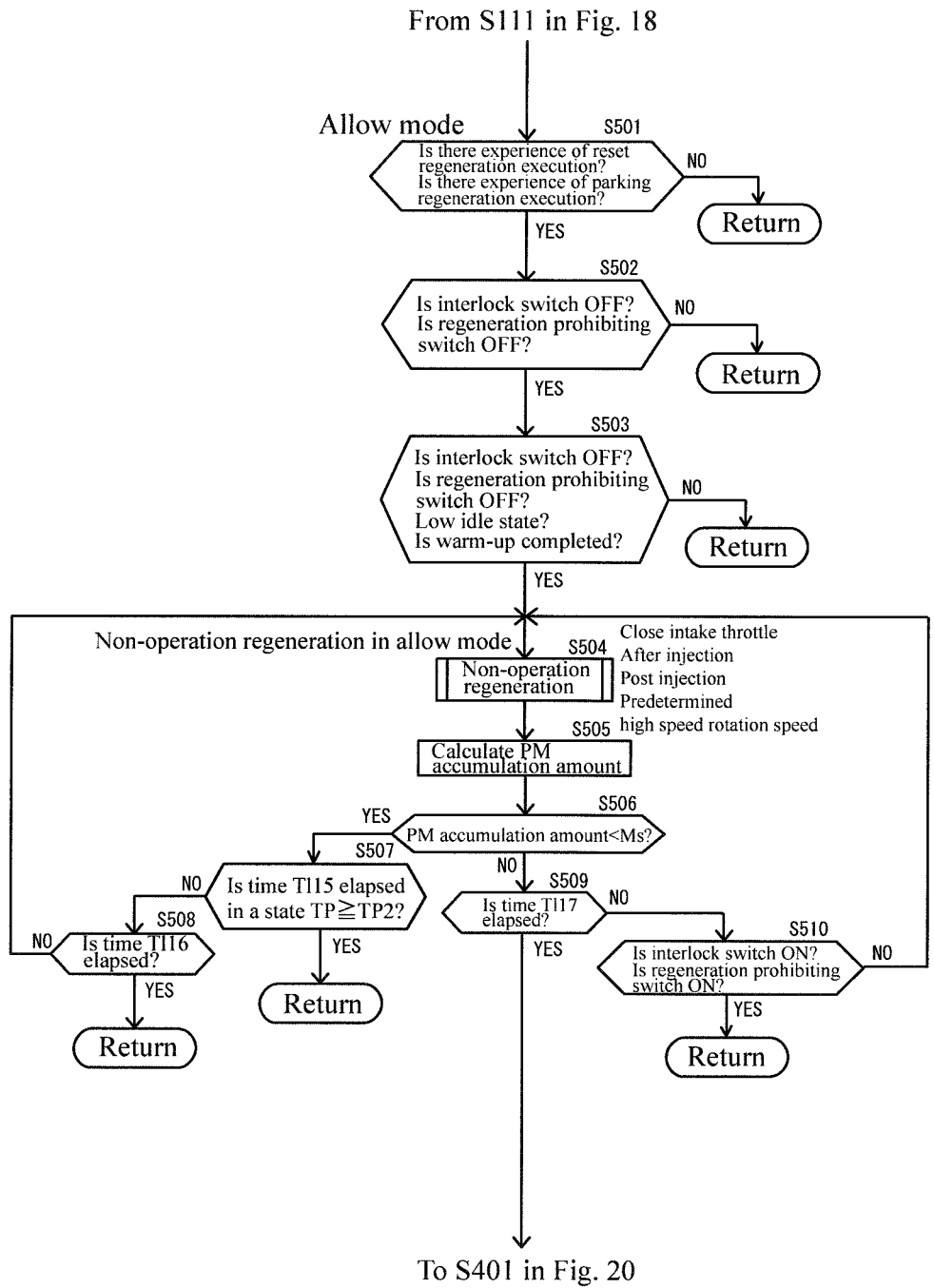
FIG. 21 is a flowchart of non-operation regeneration control in the allow mode in another example from which the regeneration switch is omitted.

Even if the regeneration switch 322 is omitted and only the regeneration prohibiting switch 323 is provided, the same control as the above-described embodiment can be executed. In this case, the regeneration prohibiting switch 323 should be of alternate operation type. As shown in step S201 in FIG. 18, step S304 in FIG. 19, step S401 in FIG. 20 and steps S502 and S503 in FIG. 21 which are other examples, even if the regeneration switch 322 is deleted from ON/OFF of the regeneration switch 322 from the discrimination criteria, it is possible to determine whether each regeneration control after the reset regeneration control can be executed. Configurations of the various parts are not limited to those of the embodiment, and the configurations can variously be changed within a range not departing from the subject matters of the invention of the present application.

REFERENCE SIGNS LIST

201 Engine
202 Exhaust gas filter
220 Common rail device
228 Intake throttle member
231 EGR valve member
240 Purification casing
243 Diesel oxidation catalyst
244 Soot filter
281 Differential pressure sensor
282 DPF temperature sensor
311 ECU
322 Regeneration switch
323 Regeneration prohibiting switch
324 Interlock switch
325 Engine alarm lamp
326 Exhaust gas temperature alarm lamp
327 Regeneration request lamp
328 Regeneration lamp
329 Regeneration prohibiting lamp

The invention claimed is:

1. An exhaust gas purification system comprising a common rail engine, and an exhaust gas filter placed in an exhaust gas path of the engine, the exhaust gas purification system being configured to execute a plurality of regeneration controls for burning and removing particulate matter accumulated in the exhaust gas filter, wherein the plurality of regeneration controls include at least reset regeneration control for raising exhaust gas temperature using post injection, non-operation regeneration control for raising exhaust gas temperature by combining the post injection and predetermined high speed rotation speed, and recovery regeneration control configured to be executed when the non-operation regeneration control fails, in the non-operation regeneration control and the recovery regeneration control, the engine is driven exclusively for burning and removing the particulate matter, the recovery regeneration control is carried out at exhaust gas temperature lower than that of the non-operation regeneration control while taking time longer than that of the non-operation regeneration control;

the exhaust gas purification system is configured to shift from the reset regeneration control to the recovery regeneration control through the non-operation regeneration control with the condition that it is also so configured that upon a predetermined cumulative time from when the reset regeneration control or the non-operation regeneration control has been executed being exceeded, shifting to the non-operation regeneration control occurs without passing through the reset regeneration control, the exhaust gas purification system is also configured so that shifting from the reset regeneration control to the non-operation regeneration control occurs through a non-operation standby mode through which shifting to the non-operation generation control is effected upon occurrence of a predetermined condition for shifting to the non-operation regeneration control, the exhaust gas purification system is also configured so that when actual cumulative driving time is equal to or greater than a pre-set value for cumulative driving time and less than a pre-set value for time elapsed after reset regeneration control or non-operation regeneration control has last been executed, shifting to the non-operation regeneration control is, without going through the reset regeneration control, executable through an allow mode through which shifting to the non-operation regeneration control is effected, the exhaust gas purification system is also configured so that shifting from the non-operation regeneration control to the recovery regeneration control is through a recovery standby mode through which shifting to the recovery regeneration control is effected upon occurrence of a predetermined condition for shifting to the recovery regeneration control, and the exhaust gas purification system is also configured so that the respective standby and allow modes remain in effect until the respective conditions for the respective shifting occur.

2. The exhaust gas purification system according to claim 1, wherein the exhaust gas purification system is further configured so that when the non-operation regeneration control fails, said shifting from the non-operation generation control to the recovery regeneration control occurs through the recovery standby mode.

3. The exhaust gas purification system according to claim 2, wherein the exhaust gas regeneration system is further configured so that during execution of the recovery regeneration control, when a predetermined recovery releasing condition is established, the recovery regeneration control is interrupted.

4. The exhaust gas purification system according to claim 1, wherein the exhaust gas regeneration system is further configured so that when the recovery regeneration control is completed, the procedure is returned to normal operation control.

5. The exhaust gas purification system according to claim 1, wherein the exhaust gas regeneration system is further configured so that output of the engine in the non-operation regeneration control is lower than maximum output of the engine.

6. The exhaust gas purification system according to claim 5, wherein the exhaust gas regeneration system is configured so that in the recovery regeneration control, output of the engine is lower than output of the engine in a time of the non-operation regeneration control.

* * * * *